US010312837B2

(12) United States Patent
Mizoguchi et al.

(10) Patent No.: US 10,312,837 B2
(45) Date of Patent: Jun. 4, 2019

(54) INFORMATION PROCESSING APPARATUS, AND RECORDING MEDIUM STORING COMPUTER PROGRAM

(71) Applicant: CANON KABUSHIKI KAISHA, Tokyo (JP)

(72) Inventors: Masahiko Mizoguchi, Kawasaki (JP); Tadayoshi Nakayama, Tokyo (JP); Toru Aida, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/495,833

(22) Filed: Apr. 24, 2017

(65) Prior Publication Data
US 2017/0317618 A1 Nov. 2, 2017

(30) Foreign Application Priority Data

May 2, 2016 (JP) .................................. 2016-092383
May 2, 2016 (JP) .................................. 2016-092384
Jun. 14, 2016 (JP) .................................. 2016-118015

(51) Int. Cl.
*H02P 6/08* (2016.01)
*G01D 5/347* (2006.01)

(52) U.S. Cl.
CPC ............. *H02P 6/08* (2013.01); *G01D 5/3473* (2013.01); *G01D 5/34707* (2013.01)

(58) Field of Classification Search
CPC .. G01D 5/34707; G01D 5/3473; H02K 11/22; H02K 11/30; H02P 6/08
See application file for complete search history.

(56) References Cited

U.S. PATENT DOCUMENTS

| 5,868,296 A * | 2/1999 | Gentile .................. B21D 43/09 226/124 |
| 7,561,830 B2 * | 7/2009 | Watahiki ............ G03G 15/5008 399/167 |
| 2009/0072774 A1 * | 3/2009 | Ueda ........................ G01D 3/02 318/400.04 |
| 2011/0220780 A1 * | 9/2011 | Ishizuka ............ G01D 5/34707 250/231.13 |
| 2012/0153135 A1 * | 6/2012 | Ishizuka ................ G01D 5/244 250/231.18 |

(Continued)

FOREIGN PATENT DOCUMENTS

JP 2006170837 A 6/2006
JP 2009303358 A 12/2009

*Primary Examiner* — Muhammad S Islam
(74) *Attorney, Agent, or Firm* — Canon U.S.A., Inc. I.P. Division

(57) ABSTRACT

An information processing apparatus includes an acquisition unit configured to acquire a first phase signal and a second phase signal that are acquired by measuring a rotation of a moving object, and a calculation unit configured to calculate a rotational angle by an iterative calculation so as to satisfy a relational expression bearing an arctangent. The relational expression bearing the arctangent uses a first cosine wave and a second cosine wave at a higher harmonic of the first cosine wave for the first phase signal, and a first sine wave and a second sine wave at a higher harmonic of the first sine wave for the second phase signal. The first phase signal and the second phase signal may, for example, be analog signals having a wave shape.

12 Claims, 29 Drawing Sheets

(56) References Cited

U.S. PATENT DOCUMENTS

2013/0335138 A1* 12/2013 Kawamura .......... H03K 5/1252
 327/551
2014/0028478 A1* 1/2014 Mizoguchi ......... G01D 5/24476
 341/11

* cited by examiner

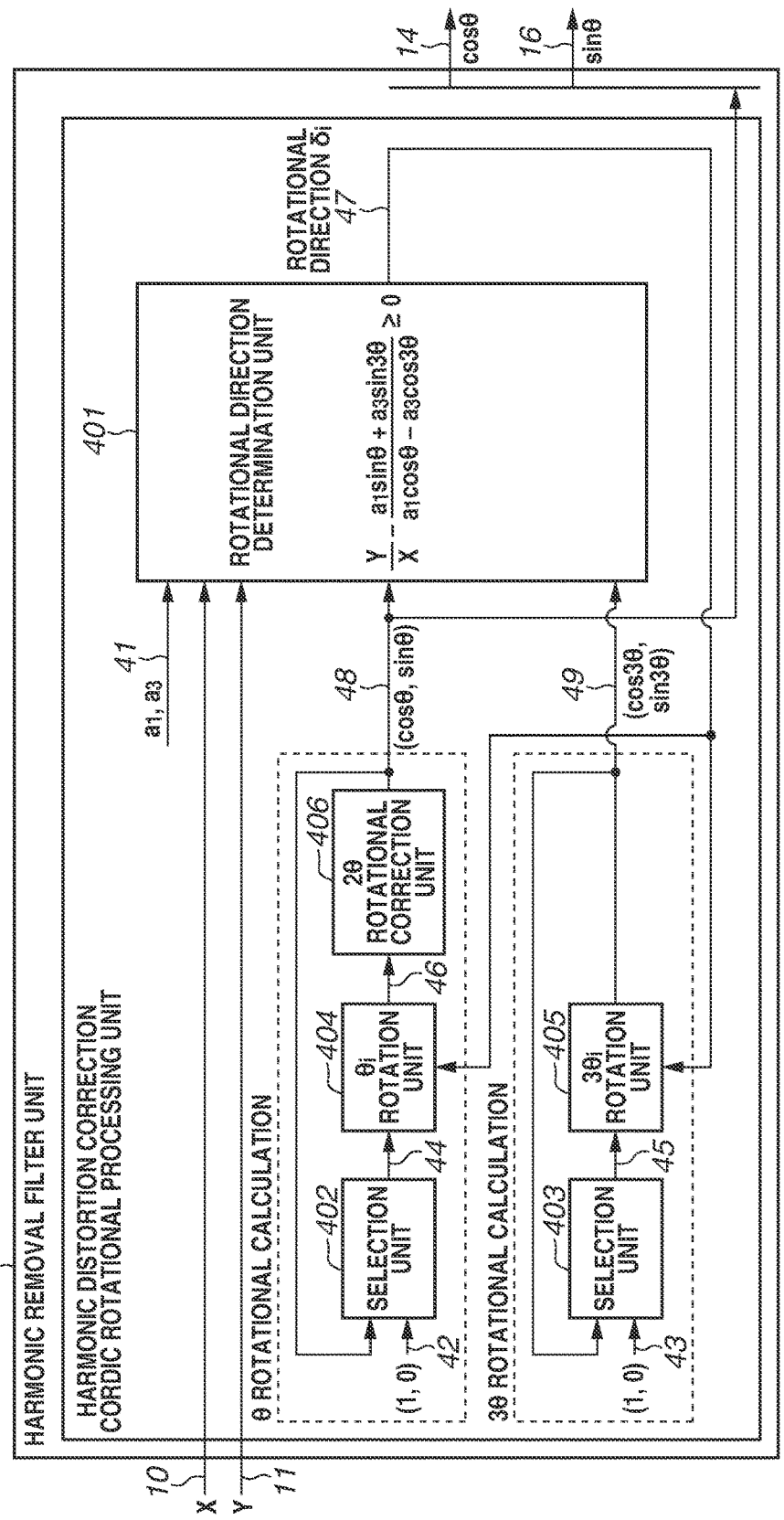

INFORMATION PROCESSING APPARATUS, AND RECORDING MEDIUM STORING COMPUTER PROGRAM

BACKGROUND OF THE INVENTION

Field of the Invention

The present invention relates to an information processing apparatus and a recording medium storing a computer program for processing a signal acquired by measuring a moving object.

Description of the Related Art

Generally, an optical rotary encoder is widely used to detect a movement amount, an angle, a position, and/or the like of a moving object, such as a motor. The optical rotary encoder irradiates a rotational signal plate where a pattern required to detect a signal is formed, with uniform light from a light-emitting diode (LED) or the like. Then, the optical rotary encoder detects transmitted light delivered through the pattern or reflected light returned from the signal plate by a light-sensitive element, such as a photodiode or a phototransistor. The optical rotary encoder generates an electric signal pattern from a result of the detection. Then, the optical rotary encoder generates an encoder output signal based on this electric signal pattern. As functional categorization of the encoder output signal, there are known an incremental type, which is output as a relative position, and an absolute type, which is output as an absolute position. The following paragraphs will be described, focusing on the incremental type.

Regarding the incremental type, there is known a technique for realizing highly accurate detection of the position by interpolation processing. This technique works, as a precondition therefor, assuming that amplitude and offset values of the encoder signals are consistent and two-phase analog sinusoidal signals out of phase with each other by 90 degrees are output.

As specific methods for the interpolation processing, there are known a method based on resistor division and a method based on an arctangent (arctan) calculation.

As a method for carrying out the arctangent calculation, there is known a method that performs rotational calculation processing on coordinate data, which is called a "COordinate Rotation DIgital Computer (CORDIC) algorithm". First, CORDIC handles an input signal as two-dimensional coordinate data. Then, CORDIC allows the arctangent calculation to be realized only by repeating a simple calculation constituted by a bit shift and an addition/subtraction for a rotation of coordinates in this two-dimensional coordinate data.

However, the actual encoder output signal contains a harmonic component therein, and is not an ideal sinusoidal signal. Therefore, even correcting errors of the amplitude, the offset, and the phase with respect to the encoder output signal has been unable to achieve a precise sinusoidal signal, resulting in occurrence of a detection error when the interpolation processing has been performed.

To correct such a detection error, a technique discussed in Japanese Patent Application Laid-Open No. 2009-303358 generates such a correction value that a value acquired by differentiating a detected displacement amount (detected angle) of the encoder, i.e., a displacement speed is kept constant. This technique sets the generated correction value for each detected position in advance, thereby correcting the detected position. Further, a technique discussed in Japanese Patent Application Laid-Open No. 2006-170837 utilizes the fact that the detection error transitions periodically and approximates a sine wave by this detection error amount, thereby sequentially calculating the detection error amount and correcting the detected position.

SUMMARY OF THE INVENTION

The related art suffers from a number of problems. For example, the method discussed in Japanese Patent Application Laid-Open No. 2009-303358 requires preparations of correction values as many as a resolution of the detected position. Therefore, this method results in an undesirable enormous increase in a memory area storing the correction values according to an increase in the resolution of the detected position. On the other hand, the method discussed in Japanese Patent Application Laid-Open No. 2006-170837, as a first disadvantage thereof, requires a calculation time period for generating the correction value. Further, even when the transition of the detection error can approximate the ideal sine wave, positional information (a reference position) used to calculate the detection error is the detected position including the error, so that this method results in an undesirable reduction in accuracy with which the detection error is calculated due to its principle itself.

Various aspects of the present invention include, among other things, methods and apparatuses capable of processing the encoder signal of the moving object with high accuracy while saving a capacity of the memory spent for the correction of the detection error.

To ameliorate the above-described problems, according to an aspect of the present invention, an information processing apparatus includes an acquisition unit configured to acquire a first phase signal and a second phase signal that are acquired by measuring a rotation of a moving object, and a calculation unit configured to calculate a rotational angle by an iterative calculation so as to satisfy a relational expression bearing an arctangent. The relational expression bearing the arctangent uses a first cosine wave and a second cosine wave at a higher harmonic of the first cosine wave for the first phase signal, and a first sine wave and a second sine wave at a higher harmonic of the first sine wave for the second phase signal.

Further features of the present invention will become apparent from the following description of example embodiments with reference to the attached drawings.

BRIEF DESCRIPTION OF THE DRAWINGS

FIG. 9 is a block diagram illustrating a configuration of a harmonic component removal filter unit according to the fifth example embodiment.

DESCRIPTION OF THE EMBODIMENTS

In the following description, example embodiments of the present invention will be described in detail with reference to the drawings.

An information processing apparatus mounted on a motor control apparatus and capable of removing a harmonic distortion superposed on an encoder signal will be described as a first example embodiment of an information processing apparatus according to a first example embodiment of the present invention.

<Configuration of Motor Control Apparatus>

Figure 10A:
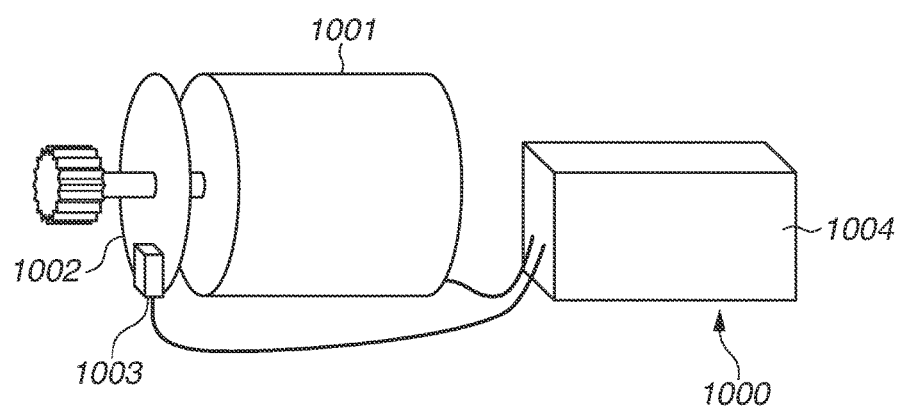
FIGS. 10A and 10B schematically illustrate the motor control apparatus.
Figure 10B:
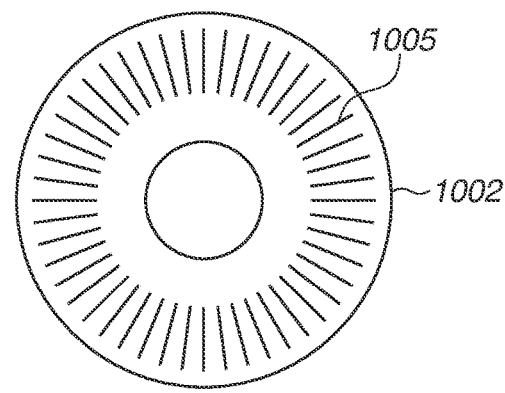

FIGS. 10A and 10B schematically illustrate a motor control apparatus according to the present example embodiment. FIG. 10A is an overall view of a motor control apparatus 1000, and FIG. 10B is a schematic plan view of an encoder scale 1002. Further, the motor control apparatus 1000 detects a rotational angle (displacement amount) of a motor shaft of a rotational motor 1001.

The rotational angle is detected by the encoder scale 1002 including a rotational slip disk and a fixed slit disk, and a sensor unit 1003 including a light-emitting element (light-emitting diode) and a light-sensitive element (photodiode). The rotational slit disk is mounted on the motor shaft of the rotational motor 1001, and rotates together with the motor shaft. On the other hand, the fixed slit disk and the sensor unit 1003 are fixed on a substrate. The encoder is configured in such a manner that the rotational slit disk and the fixed slit disk are positioned between the light-emitting element and the light-sensitive element.

A plurality of slits 1005 is provided on the encoder scale 1002. The encoder scale 1002 rotates around the motor shaft as a center of a rotational axis thereof according to a rotational displacement of the motor shaft of the rotational motor 1001. The rotation of the rotational slit disk leads to either permitting or prohibiting light of the light-emitting element to be transmitted or from being transmitted therethrough. Further, the fixed slit disk includes two slits so that signals output from the encoder have two phases.

Two light-sensitive elements are provided to the sensor unit 1003, and these light-sensitive elements form electric signal patterns having two phases by detecting the light transmitted through the slits 1005 and further divided into two types of patterns, i.e., an A-phase pattern and a B-phase pattern due to the fixed slits, respectively.

Figure 11:
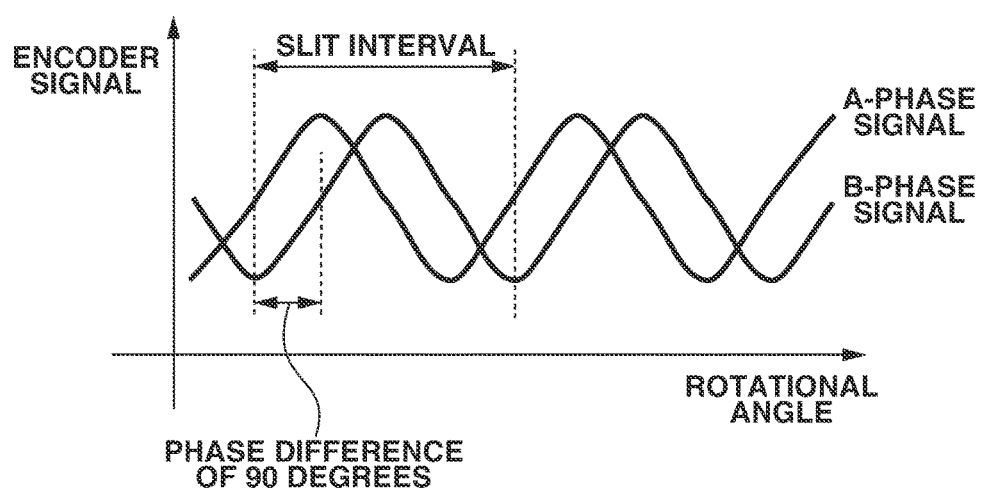
FIG. 11 illustrates two-phase encoder output signals.

FIG. 11 illustrates the two-phase encoder output signals. As illustrated in FIG. 11, an A-phase signal and a B-phase signal out of phase with each other by 90 degrees are generated in the optical encoder. The encoder is configured in this manner in a case where the encoder acquires the two-phase encoder signals, but the encoder includes a plurality of fixed slits and a plurality of light-sensitive elements in a case where the encoder acquires encoder signals having a plurality of phases. The detection principle of the encoder is not limited to the optical method (the method using the transmitted light), and the encoder can also employ another method, such as an optical method using reflected light, an electrostatic method, and a magnetic method. Further, the rotational slit disk may be mounted on a driving target body to be driven by the motor control apparatus 1000 instead of being mounted on the motor shaft, and the encoder may be configured to detect a movement amount of the driving target body.

A motor controller 1004 controls rotational driving of the rotational motor 1001. The motor controller 1004 includes a driving unit that drives the rotational motor 1001, and a control unit that controls this driving unit. The motor controller 1004 compares a motor rotational angle (target displacement amount), which is a target value, and a motor detected angle (detected displacement amount), which is an actually measured value. Then, the motor controller 1004 performs feedback control so that the actually measured value matches the target value. This is a motor control method called a closed loop, but the motor controller 1004 can employ even an open loop control method that drives the motor while acquiring the motor detected angle (detected displacement amount) but not comparing it with the target value.

Figure 1:
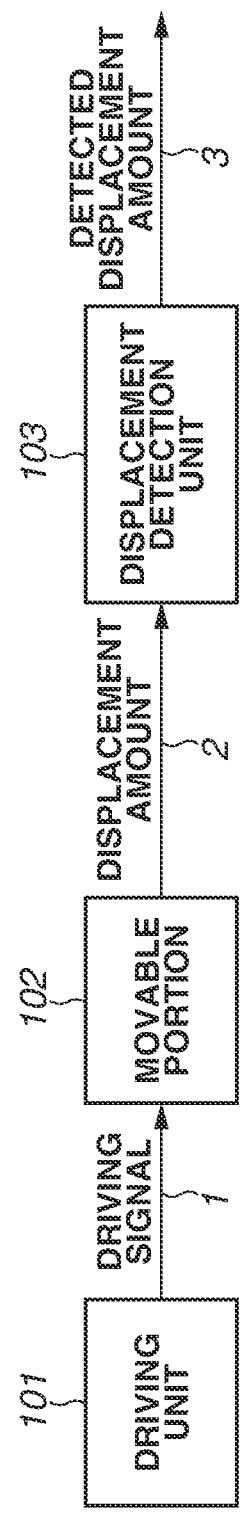
FIG. 1 is a control block diagram illustrating a motor control apparatus according to a first example embodiment.

FIG. 1 is a control block diagram of the motor control apparatus 1000 according to the present example embodiment. A driving unit 101 feeds a predetermined driving signal 1 to the rotational motor 1001 based on an output signal from the motor controller 1004, which is a superior control unit. The motor shaft, which is a movable portion 102 (measurement target object), is displaced by a predetermined rotational angle by the input of the driving signal 1 thereto. A displacement detection unit 103 detects a displacement amount (positional displacement amount) of the rotational angle of the movable portion 102 and outputs a result of the detection.

Figure 2:
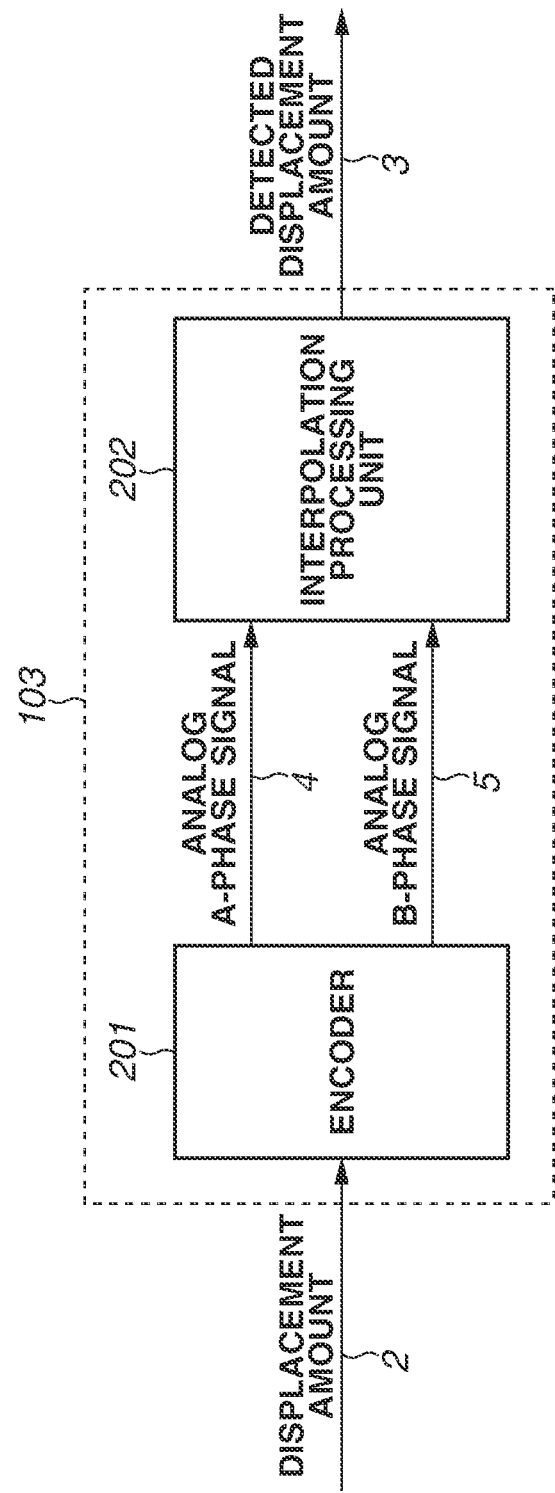
FIG. 2 is a block diagram illustrating a configuration of a displacement detection unit according to the first example embodiment.

FIG. 2 illustrates a configuration of the displacement detection unit 103 according to the present example embodiment. An encoder 201 movable according to the movement of the movable portion 102 generates the encoder signals that are sinusoidal two-phase signals out of phase with each other by 90 degrees like the examples illustrated in FIG. 11 according to the displacement amount, and outputs the generated signals to an interpolation processing unit 202. These encoder signals are not ideal sine waves and generally each contain a harmonic component therein as indicated by an actual encoder signal illustrated in FIG. 12 (only one phase is illustrated). Optical phenomena, such as occurrence of a light intensity distribution of the light-emitting element and a diffraction phenomenon due to the fixed slit and the rotational slit, are complicatedly intertwined with each other, by which this harmonic component occurs. Now, for example, the optical encoder is used as the encoder 201. However, the phenomenon in which the harmonic component occurs and is superposed is known to also occur in a magnetic encoder due to a distortion of a magnetic field distribution, a distortion of a magnetic resistance, and/or the like, and is not limited to the optical encoder.

Figure 3:
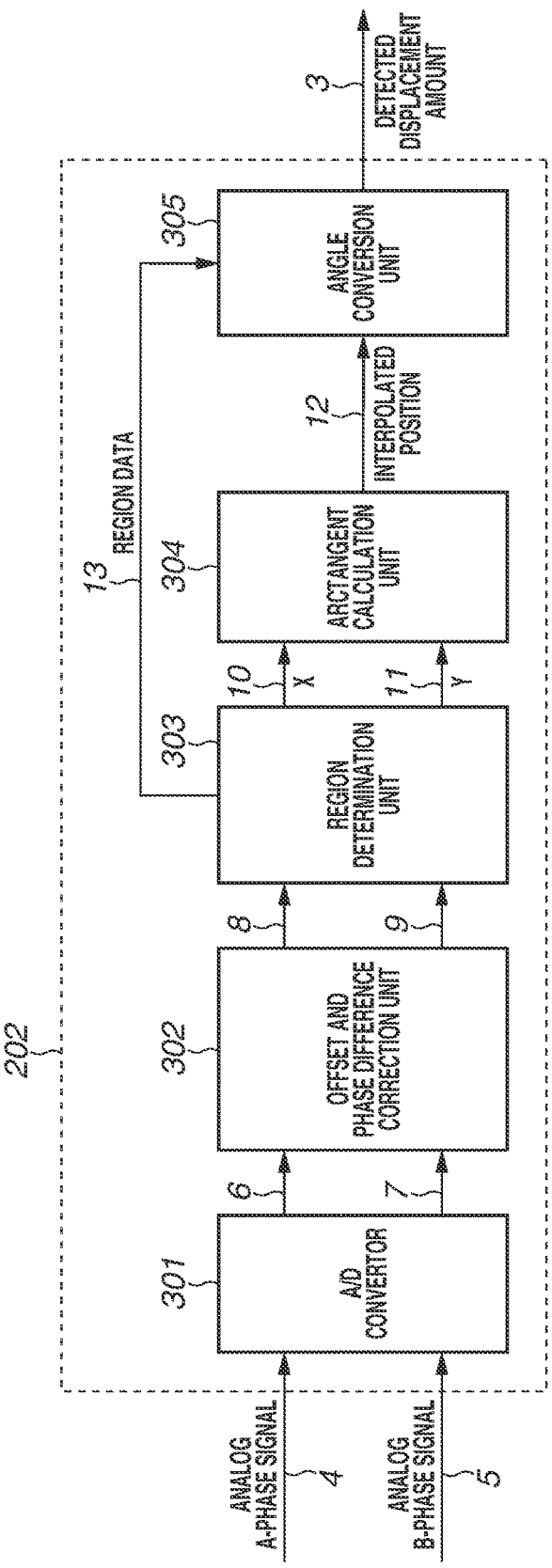
FIG. 3 is a block diagram illustrating a configuration of an interpolation processing unit according to the first example embodiment.

FIG. 3 illustrates a configuration of the interpolation processing unit 202. An analog/digital (A/D) convertor 301 is used to convert an analog A-phase signal 4 and an analog B-phase signal 5, which are analog wavelike signals, into digital signals (digital A-phase signal 6 and digital B-phase signal 7). A filter circuit and/or a noise removal circuit are/is mounted on the interpolation processing unit 202 to remove a noise component contained in the encoder signals that occurs between before and after the A/D conversion. Known configurations can be used as configurations of these filter circuit and noise removal circuit, and therefore detailed descriptions thereof will be omitted herein.

An offset and phase difference correction unit 302 performs offset processing on each of the digital A-phase signal 6 and the digital B-phase signal 7 with respect to a reference value of each of them. By this offset processing, the A-phase and B-phase encoder signals are turned into such signals that change toward a negative side and a positive side across zero.

Further, in a phase difference correction, the offset and phase difference correction unit 302 performs correction processing so that the phase difference between the A phase and the B phase matches 90 degrees. Examples of a method for this processing for correcting the phase difference include a method that performs rotational calculation processing on one of the encoder signals only by an amount corresponding to a deviation of the phase difference from 90 degrees, and a method that sets a sum of the A phase and the B phase and a difference between the A phase and the B phase as new two-phase signals, thereby guaranteeing that the phase difference matches 90 degrees regarding the new two-phase signals. In this manner, an adjusted digital A-phase signal 8 and an adjusted digital B-phase signal 9 offset and corrected in terms of the phase difference are acquired.

A region determination unit 303 determines a Lissajous quadrant (region) generated from the adjusted digital A-phase signal 8 and the adjusted digital B-phase signal 9. Assume that the Lissajous quadrant is a first quadrant if both the A-phase signal and the B-phase signal are positive, a second quadrant if the A-phase signal is negative and the B-phase signal is positive, a third quadrant if both the A-phase signal and the B-phase signal are negative, and a fourth quadrant if the A-phase signal is positive and the B-phase signal is negative. Positional information of the encoder is incremented or decremented according to a change in the quadrant at this time, by which rough positional information is acquired. This positional information allows the position to be acquired 90-degrees by 90-degrees, for example, if an encoder slit interval is determined to be 360 degrees. A sum of this rough positional information and an interpolated position, which will be described below, is determined to be the detected displacement amount, but this rough positional information will not be described in the following paragraphs because the present description will focus only on the interpolation processing (interpolated position).

Further, the region determination unit 303 outputs A-phase data X 10, which is an absolute value of the adjusted digital A-phase signal 8, and B-phase data Y 11, which is an absolute value of the adjusted B-phase signal 9, so as to allow calculation processing subsequent to the region determination unit 303 to be performed with use of only positive values.

An arctangent calculation unit 304 calculates the interpolated position by calculating an arctangent value (arctan) based on the A-phase data X 10 and the B-phase data Y 11, and outputs an interpolated position 12 in a range of 0 degrees to 90 degrees, i.e., in the first quadrant.

An angle conversion unit 305 corrects the interpolated position 12 in the range of 0 degrees to 90 degrees that is calculated by the arctangent calculation unit 304 according to the quadrant information (division into the four quadrants) determined by the region determination unit 303. More specifically, the interpolated position 12 is directly set as the detected displacement amount if the quadrant information indicates the first quadrant or the third quadrant, and "90 degrees—the interpolated position 12" is set as the detected displacement amount if the quadrant information indicates the second quadrant or the fourth quadrant (the rough positional information is added at this time in a case where the rough positional information is taken into consideration). In this manner, the displacement detection unit 103 sequentially calculates a highly accurate angular value subjected to the interpolation processing from the encoder signal. However, a calculation error undesirably occurs if the calculation is carried out for the angular calculation by the arctangent calculation unit 304 assuming that the encoder signal is the ideal sine wave, like the conventional technique. A cause thereof is the harmonic component contained in the encoder signal, and the detection error occurs in this case.

Figure 12:
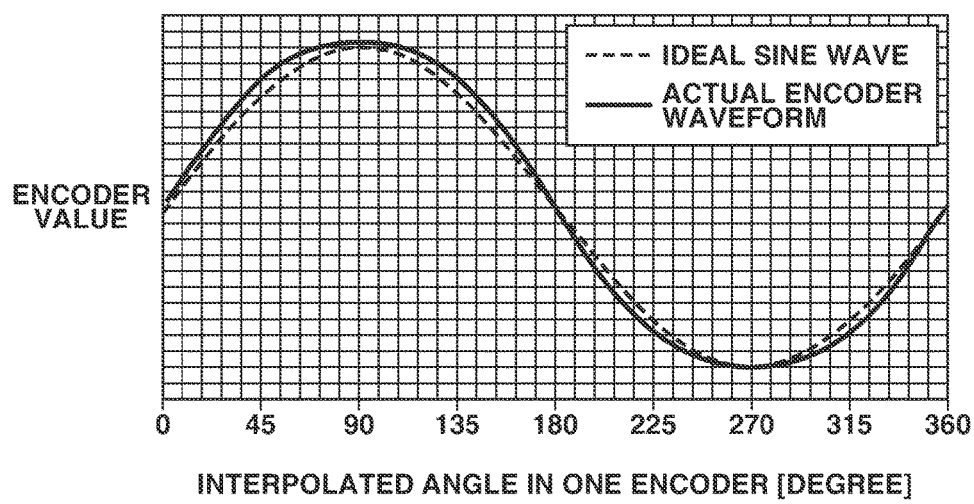
FIG. 12 illustrates an ideal waveform (sine wave) of the encoder signal and an actual waveform of the encoder signal.
Figure 13:
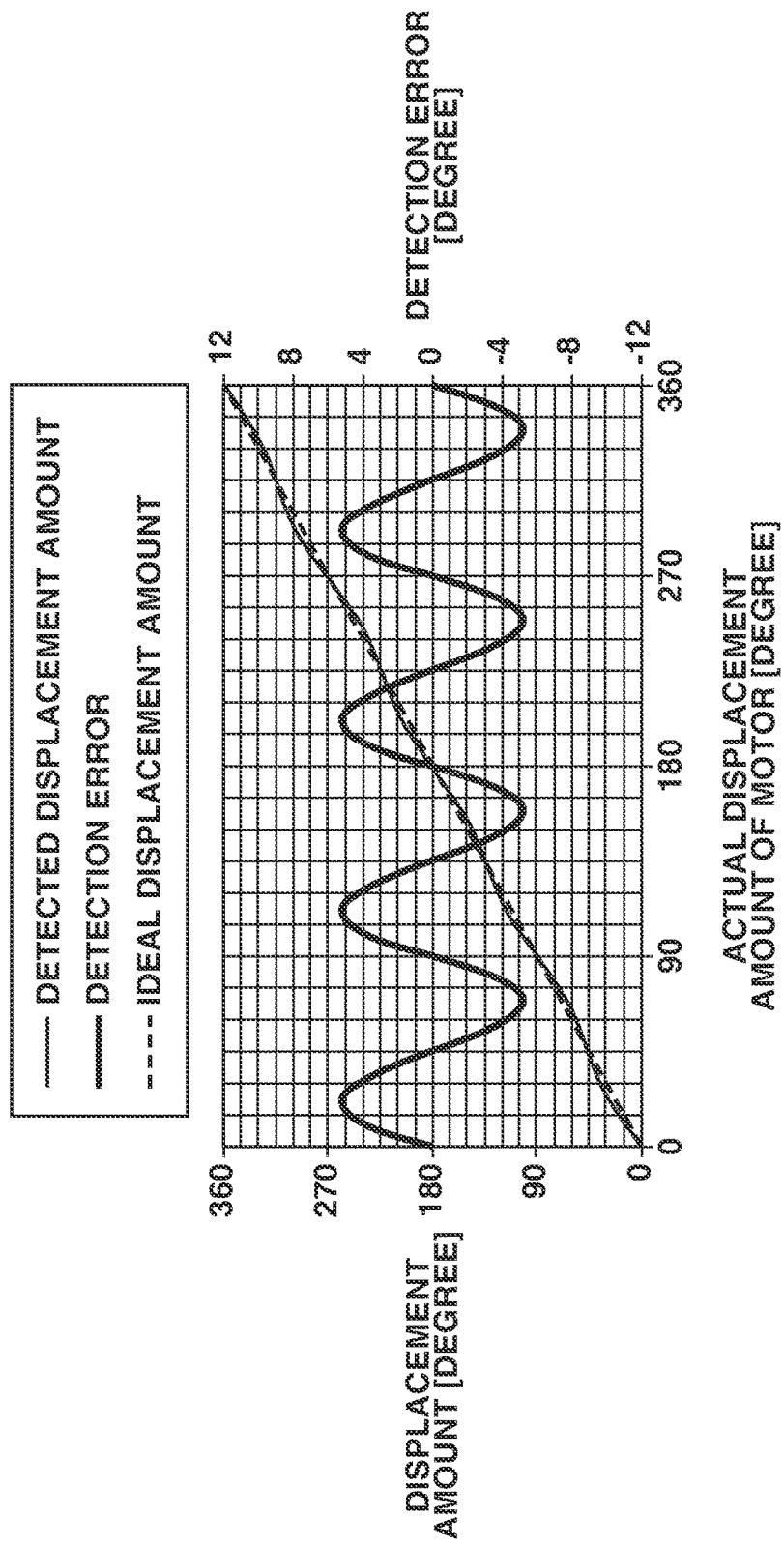
FIG. 13 illustrates a detected displacement amount and a detection error with respect to an actual displacement of the motor.
Figure 14:
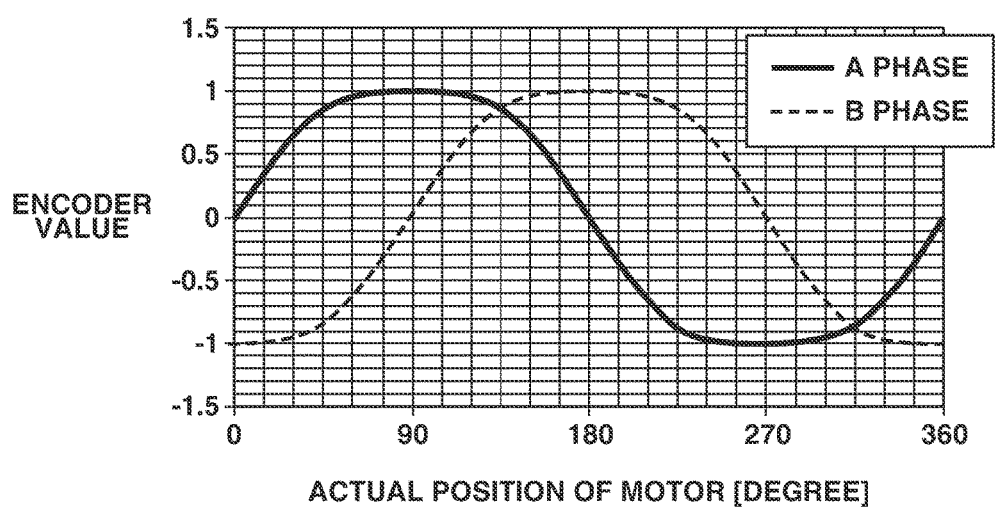
FIG. 14 illustrates a waveform of an encoder signal including a harmonic distortion according to the first example embodiment, the second example embodiment, and the fifth example embodiment.

FIG. 12 illustrates the ideal waveform (sine wave) of the encoder signal and the actual waveform of the encoder signal. Further, FIG. 13 illustrates the detected displacement amount and the detection error when the actual waveform of the encoder signal illustrated in FIG. 14 is input. The detection error refers to a difference between an actual displacement amount and the detected displacement amount of the driven motor.

As illustrated in FIG. 13, the detected displacement amount is not linear with respect to the actual displacement amount due to an influence of the detection error. In other words, the detected displacement amount draws a curve on the graph. When the encoder signal is the ideal sine wave, the displacement detection error does not occur and the actual displacement amount and the detected displacement amount are linear with respect to each other. In other words, the detected displacement amount draws a straight line on the graph.

Further, as understood from a change in the detection error illustrated in FIG. 13, the detection error periodically changes with respect to the actual displacement amount, i.e., depends on a generation amount of the harmonic component of the encoder signal, and changes so as to have four cycles in one encoder slit interval (360 degrees). Then, the error occurs by approximately ±5 degrees. However, this is an example of a characteristic when the encoder signal is the encoder waveform illustrated in FIG. 14, and the detection error is not limited thereto. Further, the above-described tendency also appears in a cosine wave.

In the above-described manner, the harmonic component occurs in the encoder signal, and carrying out the calculation without taking the harmonic component into consideration undesirably causes the detection error. The present example embodiment carries out an arctangent calculation in consideration of the harmonic component contained in the encoder signal (harmonic distortion correction CORDIC rotational calculation method) to improve detection accuracy of the displacement detection unit 103. In the following description, details thereof will be described.

<Configuration of Arctangent Calculation Unit in Consideration of Harmonic Component>

Figure 4:
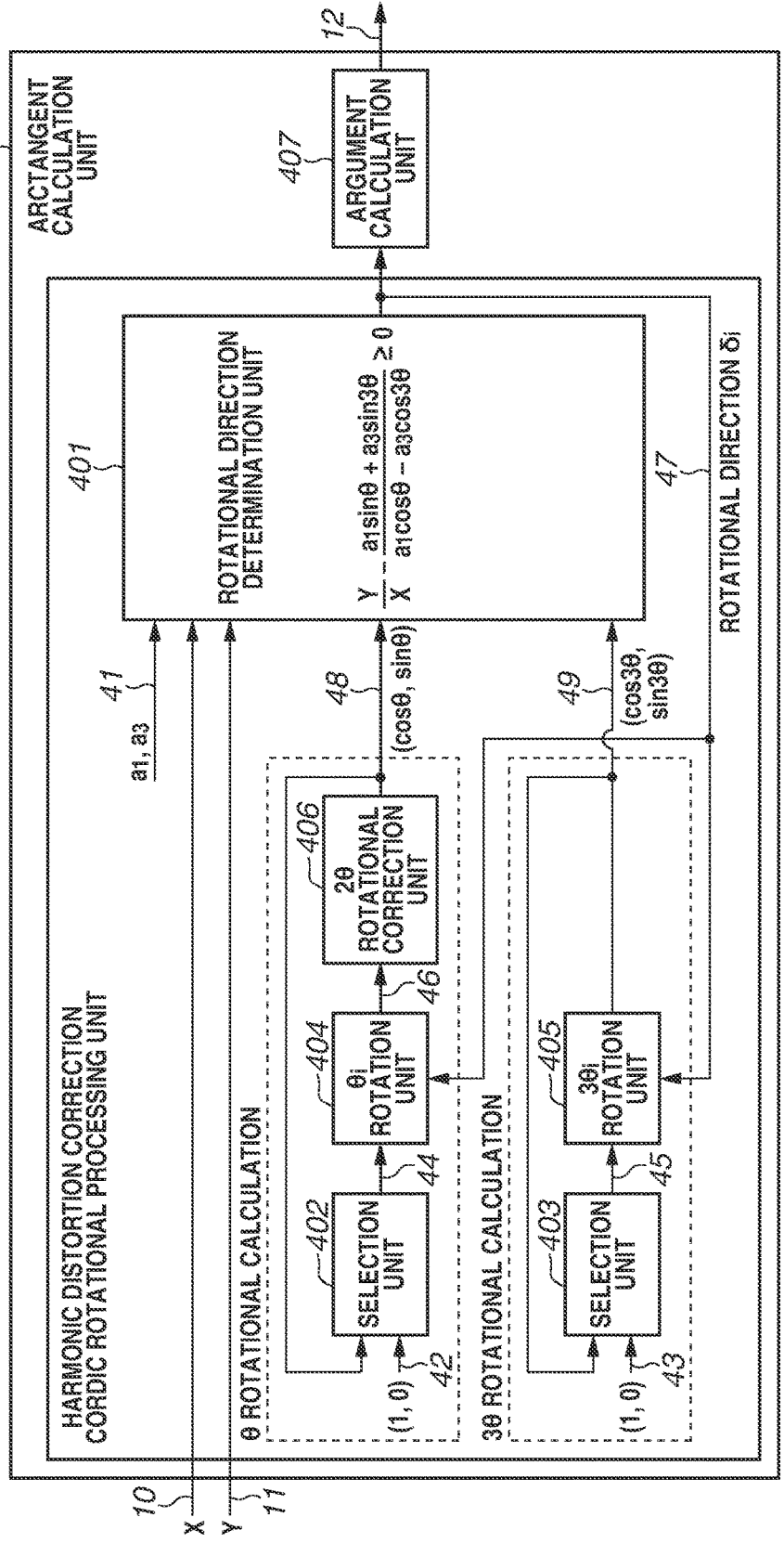
FIG. 4 is a block diagram illustrating a configuration of an arctangent calculation unit according to the first example embodiment.

FIG. 4 illustrates a configuration of the arctangent calculation unit 304 using the CORDIC rotational calculation that can correct the harmonic distortion according to the present example embodiment. In the present example embodiment, the configuration using the CORDIC calculation will be described, but the rotational angle may be acquired by being converged with use of an iterative calculation, such as a binary search. An A-phase input signal X (A-phase data X 10) and a B-phase input signal Y (B-phase data Y 11) assumed to be used in the first example embodiment are each expressed by an expression (1). However, as already described above, the A-phase data X 10 and the B-phase data Y 11 are input as the absolute values, and therefore are assumed to have only positive values actually.

$$X = a_1 \cos\theta - a_3 \cos 3\theta$$

$$Y = a_1 \sin\theta - a_3 \sin 3\theta \quad (1)$$

The first example embodiment takes the harmonic component into consideration as far as a third harmonic component as indicated in the expression (1). Further, $a_1$ and $a_3$ in the expression (1) represent a coefficient (intensity) of a fundamental frequency component and a coefficient (an intensity) of the third harmonic component, respectively, and the first example embodiment is designed for a case where each of them is the same between the A phase and the B phase. At this time, the arctangent calculation is carried out. More specifically, in the present example embodiment, a rotational angle θ satisfying a relational expression indicated by an expression (2) acquired from the expression (1) is acquired by the CORDIC rotational calculation method.

$$\frac{Y}{X} = \frac{a_1 \sin\theta + a_3 \sin 3\theta}{a_1 \cos\theta - a_3 \cos 3\theta} \quad (2)$$

Intensity information 41 ($a_1$ and $a_3$) is input from the superior control unit to a rotational direction determination unit 401 as known information. This intensity information 41 can be acquired by, for example, a method that analyzes a frequency of the encoder signal by fast Fourier transform (FFT) in advance, and extracts intensity components of the fundamental frequency and the third harmonic. However, the information input here does not necessary have to be the intensity component, and such an arbitrary value that can reduce detection error may be selected as a value corresponding to the intensity information 41.

<θ Rotational Calculation>

In a θ rotational calculation, a rotational calculation is carried out based on a basic rotational angle θ, and this is rotational calculation processing for acquiring coordinate data corresponding to the fundamental frequency component. A selection unit 402 forming the θ rotational calculation selects a fixed value (1, 0) that is reference coordinate data 42 at the first rotational calculation in a series of CORDIC calculations, and selects θ rotated coordinate data 48, which is a result of the CORDIC rotational calculation, at the second and subsequent rotational calculations, which is carried out as an iterative calculation. The A-phase data X 10 and the B-phase data Y 11 are updated, and the above-described iterative calculation is cleared when a new arctangent calculation is carried out. Then, this leads to a start of a new CORDIC calculation, in which the reference coordinate data 42 (1, 0) is recursively selected as the first rotational calculation and the rotated coordinate data 48 is selected after that.

A $\theta_i$ rotation unit 404 is a rotational calculation circuit that rotates θ rotation selected coordinate data 44 by a rotational angle of $\theta_i$ in a direction indicated by a rotational direction $\delta_i$ 47. This rotational calculation has a characteristic of the CORDIC rotational calculation, and a rotational calculation expressed by an expression (3) is carried out with respect to a number of iterative rotational calculation times i.

$$\begin{bmatrix} x_i \\ y_i \end{bmatrix} = \begin{bmatrix} 1 & -\delta_i 2^{-i} \\ \delta_i 2^{-i} & 1 \end{bmatrix} \cdot \begin{bmatrix} x_{i-1} \\ y_{i-1} \end{bmatrix} \quad (3)$$

In this expression (3), $(X_{i-1}, Y_{i-1})$ is coordinate data input to the $\theta_i$ rotation unit 404, and $(X_i, Y_i)$ indicates coordinate data output from the $\theta_i$ rotation unit 404. Further, the number of the iterative rotational calculation times i has values from 0 to m−1, as m represents a final number of the iterative rotational calculation times. Further, in the expression (3), when the number of the iterative rotational calculation times i is zero, $(X_{-1}, Y_{-1})$ becomes coordinate data on a right-hand side, and this corresponds to the reference coordinate data 42 (1, 0) selected by the selection unit 402 as the first rotational calculation. Further, the rotational direction $\delta_i$ 47 is fixed to 1 (positive rotation (i.e., rotation in leftward direction)) when the number of the iterative rotational calculation times i is zero, and 1 or −1 (negative rotation (rotation in rightward direction)) is selected according to a result of the determination made by the rotational direction determination unit 401 after that. Further, the actual rotational angle $\theta_i$ of the rotational calculation with respect to the number of the rotational calculation times i, which is indicated in the expression (3), is expressed by an expression (4).

$$\theta_i = \tan^{-1}(2^{-i}) \quad (4)$$

A 2θ rotational correction unit 406 is a correction circuit that corrects a difference in the absolute value due to a difference between the number of the rotational calculation times carried out by the $\theta_i$ rotation unit 404 and the number of the rotational calculation times carried out by a $3\theta_i$ rotation unit 405, which will be described below. More specifically, the $2\theta$ rotational correction unit 406 carries out a calculation expressed by an expression (5).

$$\begin{bmatrix} x_{out} \\ y_{out} \end{bmatrix} = (1 + 2^{-2i}) \begin{bmatrix} x_{in} \\ y_{in} \end{bmatrix} \quad (5)$$

In the expression (5), $(X_{in}, Y_{in})$ on a right-hand side is rotated coordinate data 46 before the correction that is the output of the $\theta_i$ rotation unit 404, and $(X_{out}, Y_{out})$ on a left-hand side is rotated coordinate data 48 (COS $\theta$, SIN $\theta$) corrected (updated) by the $2\theta$ rotational correction unit 406.

However, this calculation does not necessarily have to be carried out by this rotational correction unit 406, and a calculation unit capable of realizing a similar function may be disposed in the rotational direction determination unit 401, which will be described below.

The above-described series of operations corresponds to one iterative rotational calculation in the basic CORDIC calculation ($\theta$ rotational calculation). In the present example embodiment, a $3\theta$ rotational calculation illustrated in FIG. 4 is also carried out at the same time as this basic CORDIC calculation ($\theta$ rotational calculation).

<$3\theta$ Rotational Calculation>

In the $3\theta$ rotational calculation, the rotational calculation is carried out based on a rotational angle $3\theta$, and this is rotational calculation processing for acquiring coordinate data corresponding to the third harmonic component. A selection unit 403 forming the $3\theta$ rotational calculation selects reference coordinate data 43 (1, 0) at the first rotational calculation in a series of CORDIC calculations ($3\theta$), and selects $3\theta$ rotated coordinate data 49, which is a result of the CORDIC rotational calculation, at the second and subsequent rotational calculations, which is carried out as an iterative calculation. The A-phase data X 10 and the B-phase data Y 11 are updated, and the above-described iterative calculation is cleared when a new arctangent calculation is carried out. Then, this leads to a start of a new CORDIC calculation, in which the reference coordinate data 43 (1, 0) is selected again as the first rotational calculation, and the rotated coordinate data 49 is selected after that.

The $3\theta_i$ rotation unit 405 rotates $3\theta$ rotation selected coordinate data 45 by the rotational angle of $3\theta_i$ in the direction indicated by the rotational direction $\delta_i$ 47. This rotational calculation has the characteristic of the CORDIC rotational calculation, and a rotational calculation expressed by an expression (6) is carried out with respect to the number of the iterative rotational calculation times i.

$$\begin{bmatrix} x'_i \\ y'_i \end{bmatrix} = \begin{bmatrix} 1 & -\delta_i 2^{-i} \\ \delta_i 2^{-i} & 1 \end{bmatrix} \cdot \begin{bmatrix} 1 & -\delta_i 2^{-i} \\ \delta_i 2^{-i} & 1 \end{bmatrix} \begin{bmatrix} 1 & -\delta_i 2^{-i} \\ \delta_i 2^{-i} & 1 \end{bmatrix} \begin{bmatrix} x'_{i-1} \\ y'_{i-1} \end{bmatrix} \quad (6)$$

In this expression (6), $(X_{i-1}', Y_{i-1}')$ is coordinate data input to the $3\theta_i$ rotation unit 405, and $(X_i', Y_i')$ indicates coordinate data (rotated coordinate data 49 (COS $3\theta$, SIN $3\theta$)) output from the $3\theta_i$ rotation unit 405. Further, in the expression (6), when the number of the iterative rotational calculation times i is zero, $(X_{-1}', Y_{-1}')$ becomes coordinate data on a right-hand side, and this corresponds to the reference coordinate data 43 (1, 0) selected by the selection unit 403 as the first rotational calculation. Further, the actual rotational angle $3\theta_i$ of the rotational calculation with respect to the number of the rotational calculation times i, which is indicated in the expression (6), is expressed by an expression (7).

$$3\theta_i = 3 \cdot \tan^{-1}(2^{-i}) \quad (7)$$

The above-described series of operations corresponds to one iterative rotational calculation in the CORDIC calculation ($3\theta$ rotational calculation), which is one of characteristics of the present example embodiment. The rotated coordinate data 49 (COS $3\theta$, SIN $3\theta$) acquired at this time corresponds to the third harmonic component contained in the encoder signal.

In the above-described manner, the rotated coordinate data 48 (COS $\theta$, SIN $\theta$) and the rotated coordinate data 49 (COS $3\theta$, SIN $3\theta$) are acquired by the $\theta$ rotational calculation and the $3\theta$ rotational calculation. However, actually, the absolute value increases every time the rotational calculation is carried out due to the characteristic of the CORDIC rotational calculation, and therefore the rotated coordinate data 48 and the rotated coordinate data 49 are multiplied by certain coefficients. However, the rotated coordinate data 48 and the rotated coordinate data 49 are brought into a state in which the coefficients of the coordinate data 48 and the coordinate data 49 match each other with the aid of the already described $2\theta$ rotational correction unit 406. Therefore, the coefficients do not directly affect the result of the calculation by the rotational direction determination unit 401, which will be described below, whereby notations of these coefficients are omitted below. In the above description, the reference coordinate data 42 and the reference coordinate data 43 are assumed to be (1, 0), but they may be any coordinate data as long as the sine component is zero and the cosine components are the same in both of them. For example, they may be (2, 0) or may be (0.5, 0).

<Determination of Rotational Direction>

The following data is input to the rotational direction determination unit 401. The rotated coordinate data 48 (COS $\theta$, SIN $\theta$) and the rotated coordinate data 49 (COS $3\theta$, SIN $3\theta$) respectively acquired from the $\theta$ rotational calculation and the $3\theta$ rotational calculation are input to the rotational direction determination unit 401. Further, the intensity information ($a_1$ and $a_3$), which is provided from the superior control unit, and the A-phase data X 10 and the B-phase data Y 11, which are the encoder signal inputs, are also input. The direction determination unit 401 determines the rotational direction $\delta_i$ 47 of the next iterative rotational calculation by using a calculation expression for determining the direction (discriminant). The expression used as the criterion is indicated by an expression (8)

$$\frac{Y}{X} - \frac{a_1 \sin\theta + a_3 \sin 3\theta}{a_1 \cos\theta - a_3 \cos 3\theta} \geq 0 \quad (8)$$

When the expression (8) is true, the rotational direction is determined to be the positive rotation (rotation in leftward direction), and $\delta_i$ has a value 1. When the expression (8) is false, the rotational direction is determined to be the negative rotation (rotation in rightward direction), and $\delta_i$ has a value −1. However, because the expression (8) can be mathematically derived, the discriminant is not limited to the expression (8). For example, a discriminant in which the fractions are cleared and the divisions are omitted as indicated in an expression (9) may be used. All of expressions derivable while maintaining the mathematical meaning of the expression (8) may be employed in the present example embodiment.

$$Ya_1 \cos\theta - Ya_3 \cos 3\theta - Xa_1 \sin\theta - Xa_3 \sin 3\theta \geq 0 \quad (9)$$

In this manner, (COS 3θ, SIN 3θ), which is the third harmonic component, is contained in the discriminant, and this achieves an effect of correcting the third harmonic. The rotational direction $\delta_i$ 47 is determined in this manner, which allows execution of the next iterative rotational calculation.

<Calculation of Interpolated Position>

The rotated coordinate data 48 and the rotated coordinate data 49 satisfying the expression (2), and a $\delta_i$ data row (data history), which serves as rotational angle information, can be acquired by carrying out the above-described θ rotational calculation, 3θ rotational calculation, and determination of the rotational direction, respectively, as many times as the final number of the iterative calculation times m. An argument calculation unit 407 carries out a calculation expressed by an expression (10) on the $\delta_i$ data row as the last calculation process, by which an argument θ formed by the rotated coordinate data 48, i.e., the interpolated position 12 (θ) with the harmonic component removed therefrom is acquired.

$$\theta = \Sigma_{i=0}^{m-1} \delta_i \tan^{-1}(2^{-i}) \quad (10)$$

Figure 15:
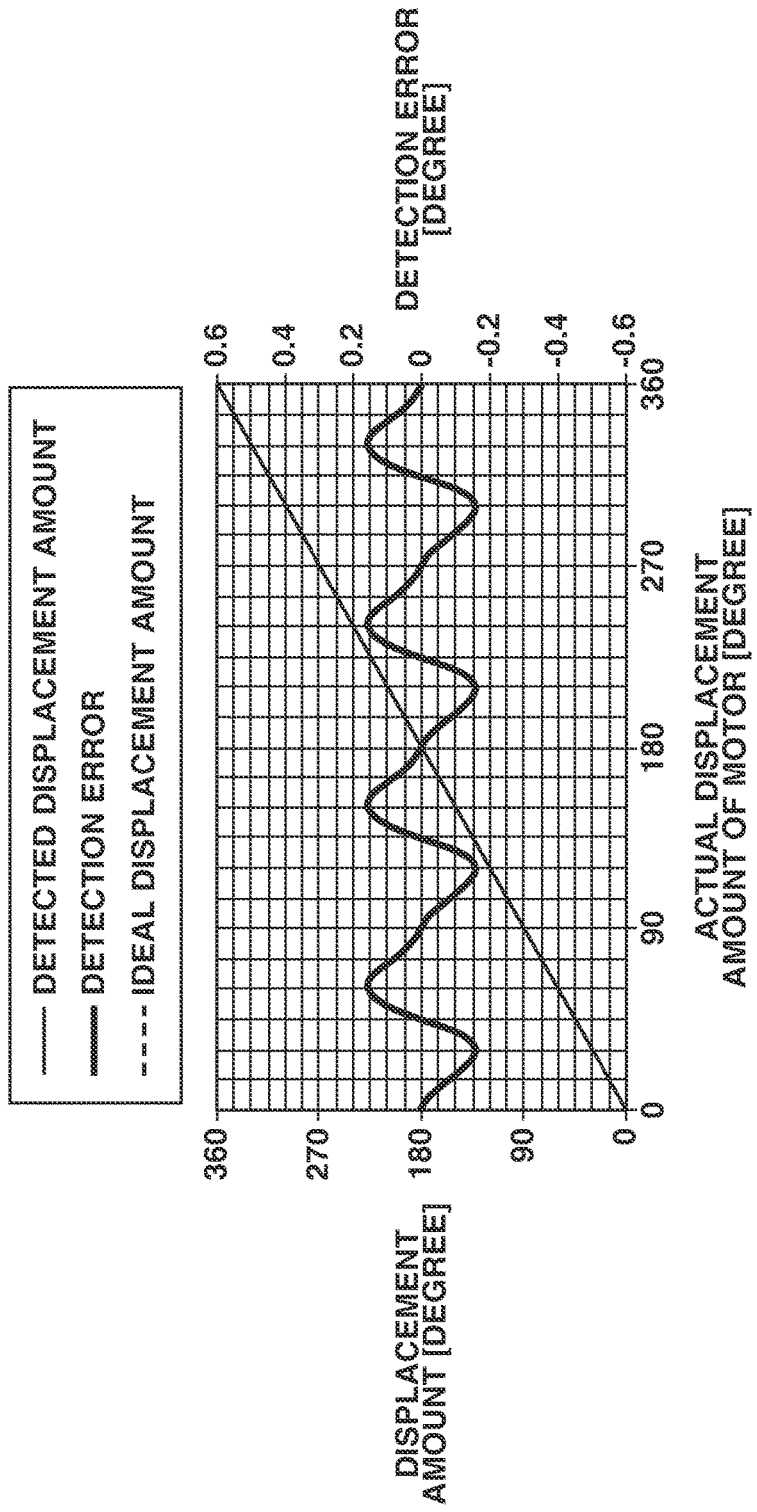
FIG. 15 illustrates a calculation result according to the first example embodiment.

In the above-described manner, according to the present example embodiment, the argument can be calculated (arctangent calculation) while the harmonic component contained in the encoder output signal is removed as far as the third harmonic. As a result, the detected position can be acquired with high accuracy in which the detection error due to the third harmonic component is removed (corrected). FIG. 15 illustrates the result of the calculation according to the present example embodiment when the encoder signal illustrated in FIG. 13 is input. This result of the calculation is a result when the intensity $a_1$ of the fundamental frequency component is 1 and the intensity $a_3$ of the third harmonic component is −0.094. As illustrated in FIG. 15, the detection error is approximately ±0.15 degrees, and thus considerably reduces compared to the detection error when no correction is made. As a result, the detected displacement amount also almost matches the ideal displacement amount (they appear to overlap on the graph).

In the above-described manner, the calculation of the third harmonic component (3θ rotational calculation) is carried out at the same time as the conventional CORDIC calculation (corresponding to the θ rotational calculation). Then, the determination of the direction is also the improved determination using the discriminant in which the third harmonic component is added to the one in the conventional CORDIC calculation, and a calculation processing speed is not inferior compared to the conventional CORDIC calculation (in the case where only the θ rotational calculation is carried out). Further, the present example embodiment can also prevent or cut down the increase in the detection error correction memory. The present example embodiment can also be applied to another embodiment. For example, in the above description, the rotational motor is used as the movable portion 102, but a linearly moving mechanism may be used instead thereof. Further, the movable portion 102 may be driven by an actuator such as a motor and a piezo actuator as the driving unit.

In a second example embodiment, another configuration of the arctangent calculation unit 304 will be described. More specifically, the second example embodiment is configured in consideration of harmonic components as far as a fifth harmonic component, and a 5θ rotational calculation is added therein. Further, an expression used to determine the direction is different. In the following description, mainly, differences from the first example embodiment will be described.

<Configuration of Arctangent Calculation Unit in Consideration of Harmonic Component>

Figure 5:
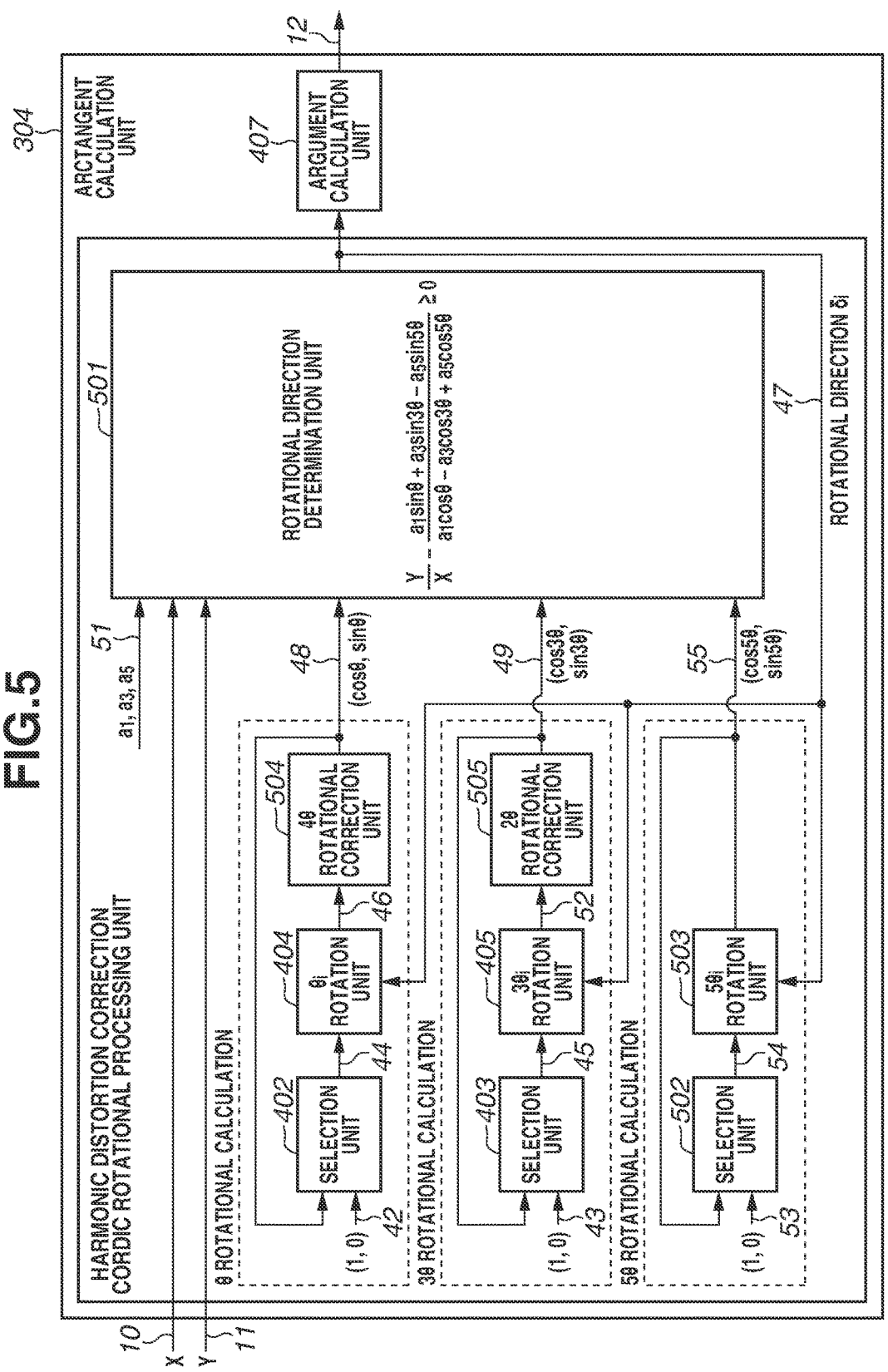
FIG. 5 is a block diagram illustrating a configuration of an arctangent calculation unit according to a second example embodiment.

FIG. 5 illustrates a configuration of the arctangent calculation unit 304 using a CORDIC rotational calculation capable of correcting harmonic distortions as far as a fifth harmonic distortion according to the present example embodiment. The A-phase data X 10 and the B-phase data Y 11 assumed to be used in the second example embodiment are each expressed by an expression (11). However, as already described above, the A-phase data X 10 and the B-phase data Y 11 are input as the absolute values, and therefore are assumed to have only positive values actually.

$$X = a_1 \cos\theta - a_3 \cos 3\theta + a_5 \cos 5\theta$$

$$Y = a_1 \sin\theta + a_3 \sin 3\theta - a_5 \sin 5\theta \quad (11)$$

The present example embodiment takes the harmonic components into consideration as far as the fifth harmonic component as indicated in the expression (11). Further, $a_1$, $a_3$, and $a_5$ in the expression (11) represent the intensity of the fundamental frequency component, the intensity of the third harmonic component, and an intensity of the fifth harmonic component, respectively, and the present example embodiment takes a case where each of them is the same between the A phase and the B phase. At this time, the arctangent calculation is carried out. More specifically, in the present example embodiment, θ satisfying a relational expression indicated by an expression (12) obtained from the expression (11) is obtained by the CORDIC rotational calculation method.

$$\frac{Y}{X} = \frac{a_1 \sin\theta + a_3 \sin 3\theta - a_5 \sin 5\theta}{a_1 \cos\theta - a_3 \cos 3\theta + a_5 \cos 5\theta} \quad (12)$$

Intensity information 51 ($a_1$, $a_3$, and $a_5$) is input from the superior control unit to a rotational direction determination unit 501 as known information. This intensity information 51 can be acquired by, for example, a method that analyzes the frequency of the encoder signal by FFT in advance, and extracts the intensity components of the fundamental frequency, the third harmonic, and the fifth harmonic.

<θ Rotational Calculation>

A basic operation is similar to that of the first example embodiment, but a 4θ rotational correction unit 504 is different from that of the first example embodiment.

The 4θ rotational correction unit 504 corrects a difference in the absolute value due to a difference between the number of times that the rotational calculation is carried out by the $\theta_i$ rotation unit 404 and the number of times that the rotational calculation is carried out by a 5$\theta_i$ rotation unit 503, which will be described below. More specifically, the 4θ rotational correction unit 504 carries out a calculation expressed by an expression (13).

$$\begin{bmatrix} x_{out} \\ y_{out} \end{bmatrix} = (1 + 2^{-2i})^2 \begin{bmatrix} x_{in} \\ y_{in} \end{bmatrix} \quad (13)$$

In the expression (13), ($X_{in}$, $Y_{in}$) on a right-hand side is the rotated coordinate data 46 before the correction that is the output of the $\theta_i$ rotation unit 404, and ($X_{out}$, $Y_{out}$) on a left-hand side is the rotated coordinate data 48 (COS θ, SIN θ) corrected (updated) by the 4θ rotational correction unit 504.

<3θ Rotational Calculation>

A basic operation is similar to that of the first example embodiment, but a 2θ rotational correction unit 505 is added thereto.

The 2θ rotational correction unit 505 corrects a difference in the absolute value due to a difference between the number of times that the rotational calculation is carried out by the 3θ$_i$ rotation unit 405 and the number of times that the rotational calculation is carried out by the 5θ$_i$ rotation unit 503, which will be described below. More specifically, the 2θ rotational correction unit 505 carries out a calculation expressed by an expression (14).

$$\begin{bmatrix} x_{out} \\ y_{out} \end{bmatrix} = (1 + 2^{-2i}) \begin{bmatrix} x_{in} \\ y_{in} \end{bmatrix} \quad (14)$$

In the expression (14), $(X_{in}, Y_{in})$ on a right-hand side is rotated coordinate data 52 before the correction that is the output of the θ$_i$ rotation unit 405, and $(X_{out}, Y_{out})$ on a left-hand side is the rotated coordinate data 49 (COS 3θ, SIN 3θ) corrected (updated) by the 2θ rotational correction unit 505.

<5θ Rotational Calculation>

A selection unit 502 forming the 5θ rotational calculation selects reference coordinate data 53 (1, 0) at the first rotational calculation in a series of CORDIC calculations (5θ), and selects 5θ rotated coordinate data 55, which is a result of the CORDIC rotational calculation, at the second and subsequent rotational calculations, which is carried out as an iterative calculation. The A-phase data X 10 and the B-phase data Y 11 are updated, and the above-described iterative calculation is cleared when a new arctangent calculation is carried out. Then, this leads to a start of a new CORDIC calculation, in which the reference coordinate data 53 (1, 0) is selected again as the first rotational calculation, and the rotated coordinate data 55 is selected after that.

The 5θ$_i$ rotation unit 503 rotates 5θ rotation selected coordinate data 54 by a rotational angle of 5θ$_i$ in the direction indicated by the rotational direction δ$_i$ 47. This rotational calculation has the characteristic of the CORDIC rotational calculation, and a rotational calculation expressed by an expression (15) is carried out with respect to the number of times i that the rotational calculation is iteratively carried out.

$$\begin{bmatrix} x_i'' \\ y_i'' \end{bmatrix} = \begin{bmatrix} 1 & -\delta_i 2^{-i} \\ \delta_i 2^{-i} & 1 \end{bmatrix} \cdot \begin{bmatrix} 1 & -\delta_i 2^{-i} \\ \delta_i 2^{-i} & 1 \end{bmatrix} \cdot \begin{bmatrix} 1 & -\delta_i 2^{-i} \\ \delta_i 2^{-i} & 1 \end{bmatrix} \cdot \begin{bmatrix} 1 & -\delta_i 2^{-i} \\ \delta_i 2^{-i} & 1 \end{bmatrix} \cdot \begin{bmatrix} 1 & -\delta_i 2^{-i} \\ \delta_i 2^{-i} & 1 \end{bmatrix} \cdot \begin{bmatrix} x_{i-1}'' \\ y_{i-1}'' \end{bmatrix} \quad (15)$$

In this expression (15), $(X_{i-1}'', Y_{i-1}'')$ is coordinate data input to the 5θ$_i$ rotation unit 503, and $(X_i'', Y_i'')$ indicates coordinate data (rotated coordinate data 55 (COS 5θ, SIN 5θ)) output from the 5θ$_i$ rotation unit 503. Further, in the expression (15), when the number of the iterative rotational calculation times i is zero, $(X_{-1}'', Y_{-1}'')$ becomes coordinate data on a right-hand side, and this corresponds to the reference coordinate data 53 (1, 0) selected by the selection unit 502 as the first rotational calculation. Further, the actual rotational angle 5θ$_i$ in the rotational calculation with respect to the number of times i that the rotational calculation is carried out, which is indicated in the expression (15), is expressed by an expression (16).

$$5\theta_i = 5 \cdot \tan^{-1}(2^{-i}) \quad (16)$$

The above-described series of operations corresponds to one iterative rotational calculation in the CORDIC calculation that is the 5θ rotational calculation according to the present example embodiment. Now, the acquired rotated coordinate data 55 (COS 5θ, SIN 5θ) corresponds to the fifth harmonic component contained in the encoder signal.

In the above-described manner, the rotated coordinate data 48 (COS θ, SIN θ), the rotated coordinate data 49 (COS 3θ, SIN 3θ), and the rotated coordinate data 55 (COS 5θ, SIN 5θ) are acquired by the θ rotational calculation, the 3θ rotational calculation, and the 5θ rotational calculation, respectively. However, actually, the absolute value increases every time the rotational calculation is carried out due to the characteristic of the CORDIC rotational calculation, and therefore the rotated coordinate data 48, the rotated coordinate data 49, and the rotated coordinate data 55 are multiplied by coefficients. However, the rotated coordinate data 48, the rotated coordinate data 49, and the rotated coordinate data 55 are brought into a state in which the coefficients of the coordinate data 48, the coordinate data 49 and the coordinate data 55 match one another with the aid of the already described 4θ rotational correction unit 504 and 28 rotational correction unit 505. Therefore, the coefficients do not directly affect the result of the calculation by the rotational direction determination unit 501, which will be described below, whereby notations of these coefficients shall be omitted below.

<Determination of Rotational Direction>

The rotated coordinate data 48 (COS θ, SIN θ), the rotated coordinate data 49 (COS 3θ, SIN 3θ), and the rotated coordinate data 55 (COS 5θ, SIN 5θ) respectively obtained from the θ rotational calculation, the 3θ rotational calculation, and the 5θ rotational calculation are input to the rotational direction determination unit 501. Further, the intensity information $(a_1, a_3, \text{ and } a_5)$, which is provided from the superior control unit, and the A-phase data X 10 and the B-phase data Y 11, which are the encoder signal inputs, are also input. The direction determination unit 501 determines the rotational direction δ$_i$ 47 of the next iterative rotational calculation by a calculation expression for determining the direction. The expression used as the discriminant is indicated by an expression (17)

$$\frac{Y}{X} - \frac{a_1 \sin\theta + a_3 \sin 3\theta - a_5 \sin 5\theta}{a_1 \cos\theta - a_3 \cos 3\theta + a_5 \cos 5\theta} \geq 0 \quad (17)$$

When the expression (17) is true, the rotational direction is determined to be the positive rotation (rotation in the leftward direction), and δ$_i$ has the value 1. When the expression (17) is false, the rotational direction is determined to be the negative rotation (rotation in the rightward direction), and δ$_i$ has the value −1. However, because the expression (17) can be mathematically derived similarly to the first example embodiment, the discriminant is not limited to the expression (17). All of expressions derivable while maintaining the mathematical meaning of the expression (17) may be employed in the present example embodiment.

In this manner, the third harmonic component (COS 3θ, SIN 3θ) and the fifth harmonic component (COS 5θ, SIN 5θ) are contained in the discriminant, and this achieves an effect of correcting the harmonics as far as the fifth harmonic.

The rotational direction $\delta_i$ 47 is determined in this manner, which allows execution of the next iterative rotational calculation.

<Calculation of Interpolated Position>

The rotated coordinate data 48, the rotated coordinate data 49, and the rotated coordinate data 55 satisfying the expression (12) can be acquired by carrying out the above-described θ rotational calculation, 3θ rotational calculation, 5θ rotational calculation, determination of the rotational direction as many times as the final number of times m that the calculation is iteratively carried out. The argument calculation unit 407 carries out the calculation expressed by the expression (10) as the final calculation process, by which the interpolated position 12 is obtained.

Figure 16:
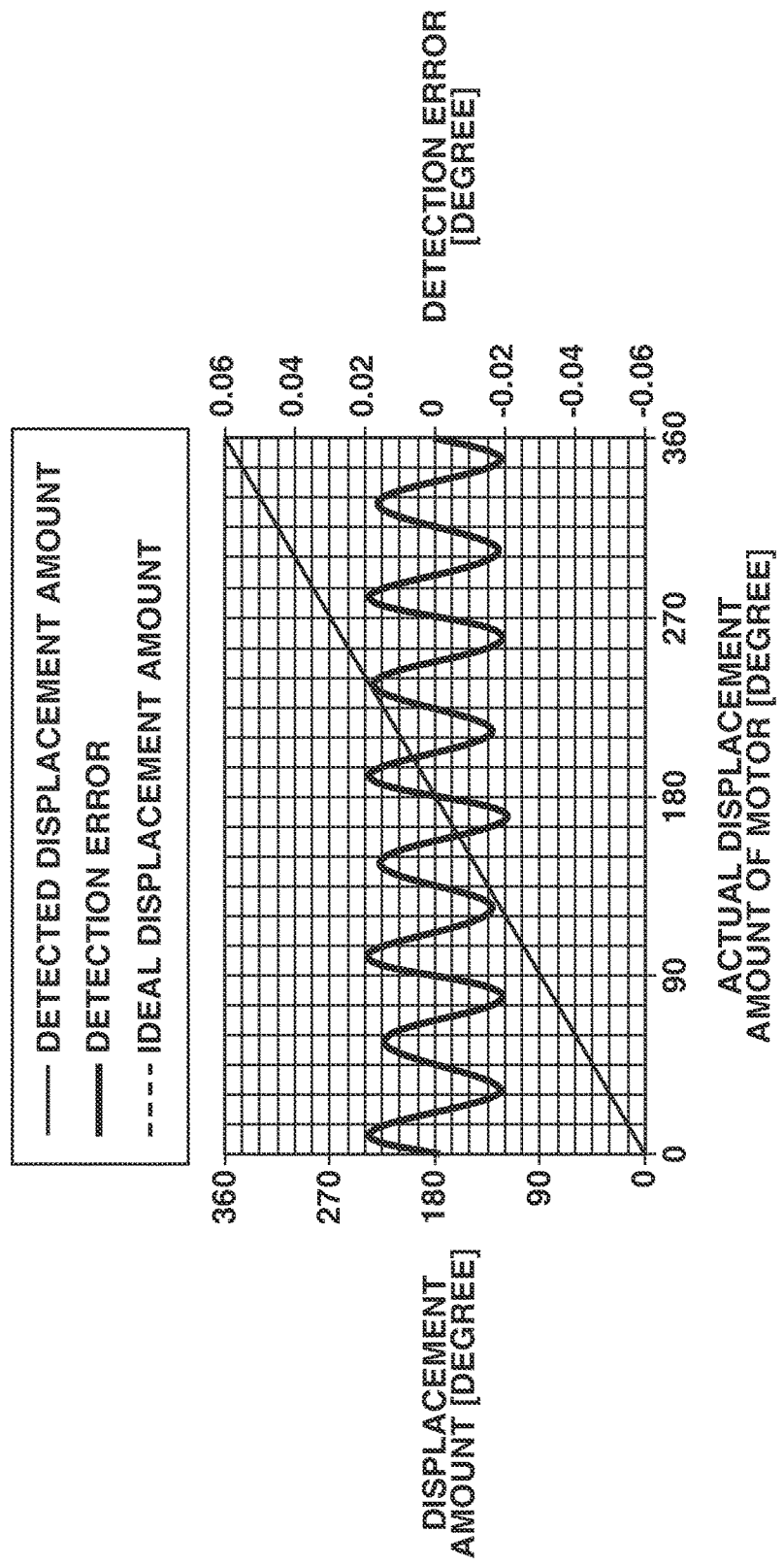
FIG. 16 illustrates a calculation result according to the second example embodiment.

In the above-described manner, according to the second example embodiment, the arctangent calculation can be realized while the harmonic components contained in the encoder output signal are removed as far as the fifth harmonic. As a result, the detection error due to the third and fifth harmonic components is removed (corrected), and the detected position can be obtained with further higher accuracy than the first example embodiment. Similar to the first example embodiment, the calculation of the third harmonic component (3θ rotational calculation) and the calculation of the fifth harmonic component (5θ rotational calculation) are carried out at the same time as the conventional CORDIC calculation (corresponding to the θ rotational calculation). The determination of the direction is also the improved determination using the discriminant in which the third harmonic component and the fifth harmonic component are added to the one in the conventional CORDIC calculation, and the calculation processing speed is not inferior compared to the conventional CORDIC calculation (in the case where only the θ rotational calculation is carried out). FIG. 16 illustrates the result of the calculation according to the second example embodiment when the encoder signal illustrated in FIG. 13 is input. The result of the calculation is a result when the intensity $a_1$ of the fundamental frequency component is 1, the intensity $a_3$ of the third harmonic component is −0.094, and the intensity $a_5$ of the fifth harmonic component is −0.0023. The detection error is approximately ±0.02 degrees, and thus further reduces compared to that when the harmonic is corrected as far as the third harmonic according to the first example embodiment.

Further, in the second example embodiment, the method for correcting the harmonics as far as the fifth harmonic has been described, but harmonic components that are a cosine component COS (nθ) and a sine component (nθ) (n is a positive odd number) can be corrected by similarly implementing the configuration extension according to the second example embodiment from the first example embodiment. More specifically, these components can be corrected by adding θ rotational calculations as far as an nθ rotational calculation, adding the rotational correction unit that performs the correction regarding the number of times that the rotational calculation is carried out, and changing the discriminant in the rotational direction determination unit. In this manner, the present example embodiment can provide the arctangent calculation capable of easily removing a high harmonic component.

In a third example embodiment, another configuration of the arctangent calculation unit 304 will be described. A difference from the first example embodiment is to provide an arctangent calculation according to a case where the intensities of the fundamental frequency and the harmonic component are different between the A phase and B phase. In the first example embodiment, the intensity of the fundamental frequency component and the intensity of the harmonic component are the same between the A phase and the B phase as indicated in the expression (1). However, they may not be the same under influences of a characteristic of the encoder, the filter processing on the encoder signal, the processing for correcting the phase difference, and/or the like. Further, the accuracy with which the harmonic component is corrected also depends on accuracy of this intensity information, so that it is more convenient to allow the intensities to be set differently for the A phase and the B phase to provide the intensities with further high accuracy. Therefore, the present example embodiment provides an arctangent calculation according to a case where the intensities of the fundamental frequency and the harmonic component are different between the A phase and the B phase. In the following description, mainly, differences from the first embodiment will be described.

<Configuration of Arctangent Calculation Unit in Consideration of Harmonic Component>

Figure 6:
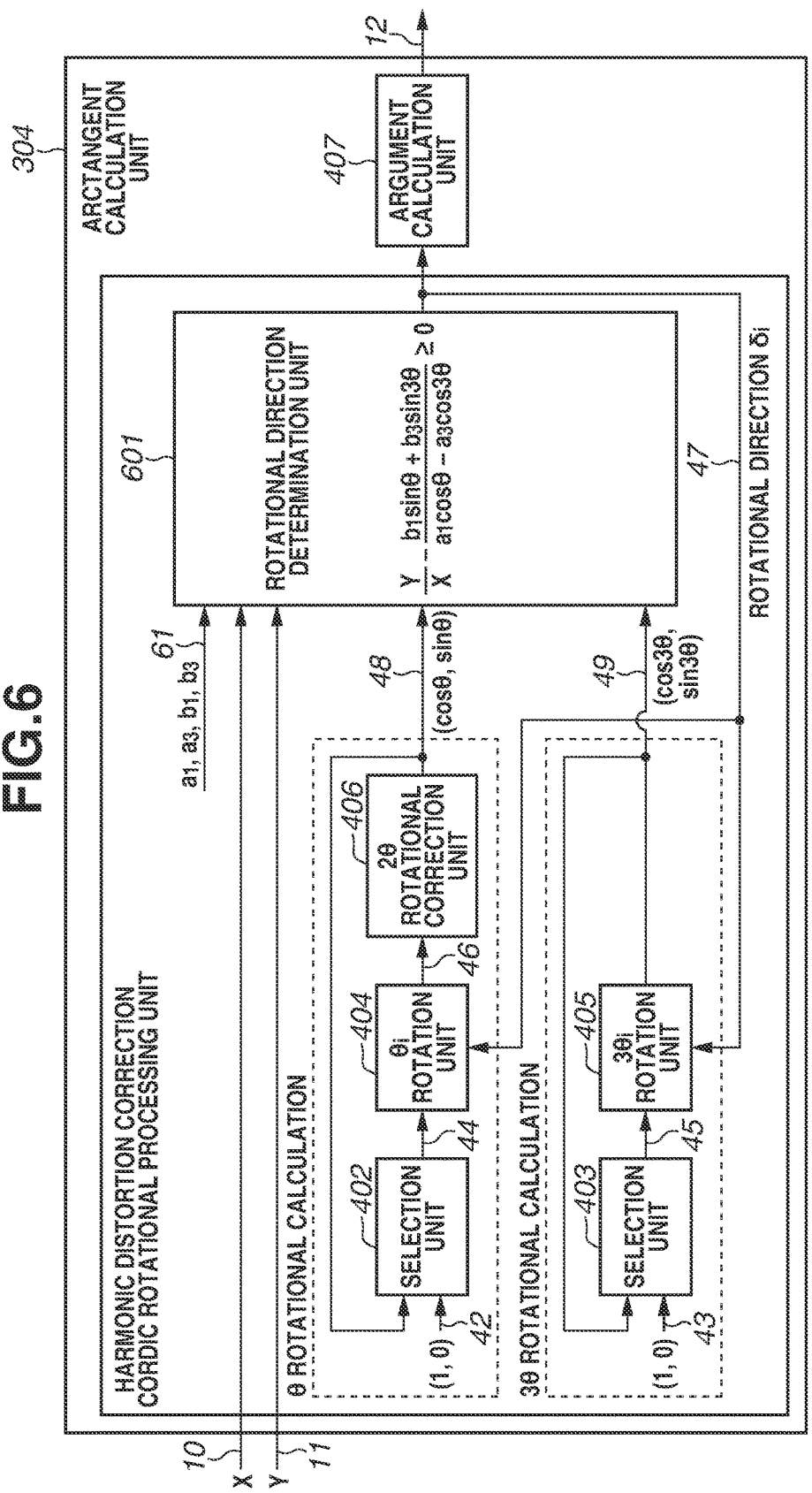
FIG. 6 is a block diagram illustrating a configuration of an arctangent calculation unit according to a third example embodiment.

FIG. 6 illustrates a configuration of the arctangent calculation unit 304 using a CORDIC rotational calculation capable of correcting the harmonic distortion as far as the third harmonic distortion according to the present example embodiment. The A-phase data X 10 and the B-phase data Y 11 assumed to be used in the third example embodiment are each expressed by an expression (17). However, as already described above, the A-phase data X 10 and the B-phase data Y 11 are input as the absolute values, and therefore are assumed to have only positive values actually.

$$X = a_1 \cos\theta - a_3 \cos 3\theta$$

$$Y = b_1 \sin\theta + b_3 \sin 3\theta \quad (18)$$

In the present example embodiment, the intensity of each of the components is different between the A phase and the B phase as illustrated in the expression (18). Therefore, in the present example embodiment, θ satisfying a relational expression indicated by an expression (1)9 obtained from the expression (18) is obtained by the CORDIC rotational calculation method (arctangent calculation is carried out).

$$\frac{Y}{X} = \frac{b_1 \sin\theta + b_3 \sin 3\theta}{a_1 \cos\theta - a_3 \cos 3\theta} \quad (19)$$

Intensity information 61 ($a_1$, $a_3$, $b_1$, and $b_3$) is input from the superior control unit to a rotational direction determination unit 601 as known information. This intensity information 61 can be acquired by, for example, a method that analyzes the frequency of the encoder signal by FFT in advance, and extracts each of the intensity components.

<θ Rotational Calculation>

The θ rotational calculation and the 3θ rotational calculation are similar to those of the first example embodiment.

<Determination of Rotational Direction>

The rotated coordinate data 48 (COS θ, SIN θ) and the rotated coordinate data 49 (COS 3θ, SIN 3θ) respectively obtained from the θ rotational calculation and the 3θ rotational calculation are input to the rotational direction determination unit 601. Further, the intensity information 61 ($a_1$, $a_3$, $b_1$, and $b_3$), which is provided from the superior control unit, and the A-phase data X 10 and the B-phase data Y 11, which are the encoder signal inputs, are also input to the rotational direction determination unit 601. The direction determination unit 601 determines the rotational direction $\delta_i$ 47 of the next iterative rotational calculation by a calculation expression for determining the direction. The expression used as the criterion is indicated by an expression (20).

$$\frac{Y}{X} - \frac{b_1\sin\theta + b_3\sin3\theta}{a_1\cos\theta - a_3\cos3\theta} \geq 0 \quad (20)$$

When the expression (20) is true, the rotational direction is determined to be the positive rotation (rotation in the leftward direction), and $\delta_i$ has the value 1. When the expression (20) is false, the rotational direction is determined to be the negative rotation (rotation in the rightward direction), and $\delta_i$ has the value −1. However, because the expression (20) can be mathematically derived similarly to the first example embodiment, the discriminant is not limited to the expression (20). All of expressions derivable while maintaining the mathematical meaning may be employed in the present example embodiment. In this manner, the iterative rotational calculation is sequentially carried out by the determination of the rotational direction $\delta_i$ 47.

In the above-described manner, according to the present example embodiment, the arctangent calculation can be provided while the third harmonic component is removed even when the intensities of the fundamental frequency and the harmonic component are different between the A phase and the B phase.

Figure 17:
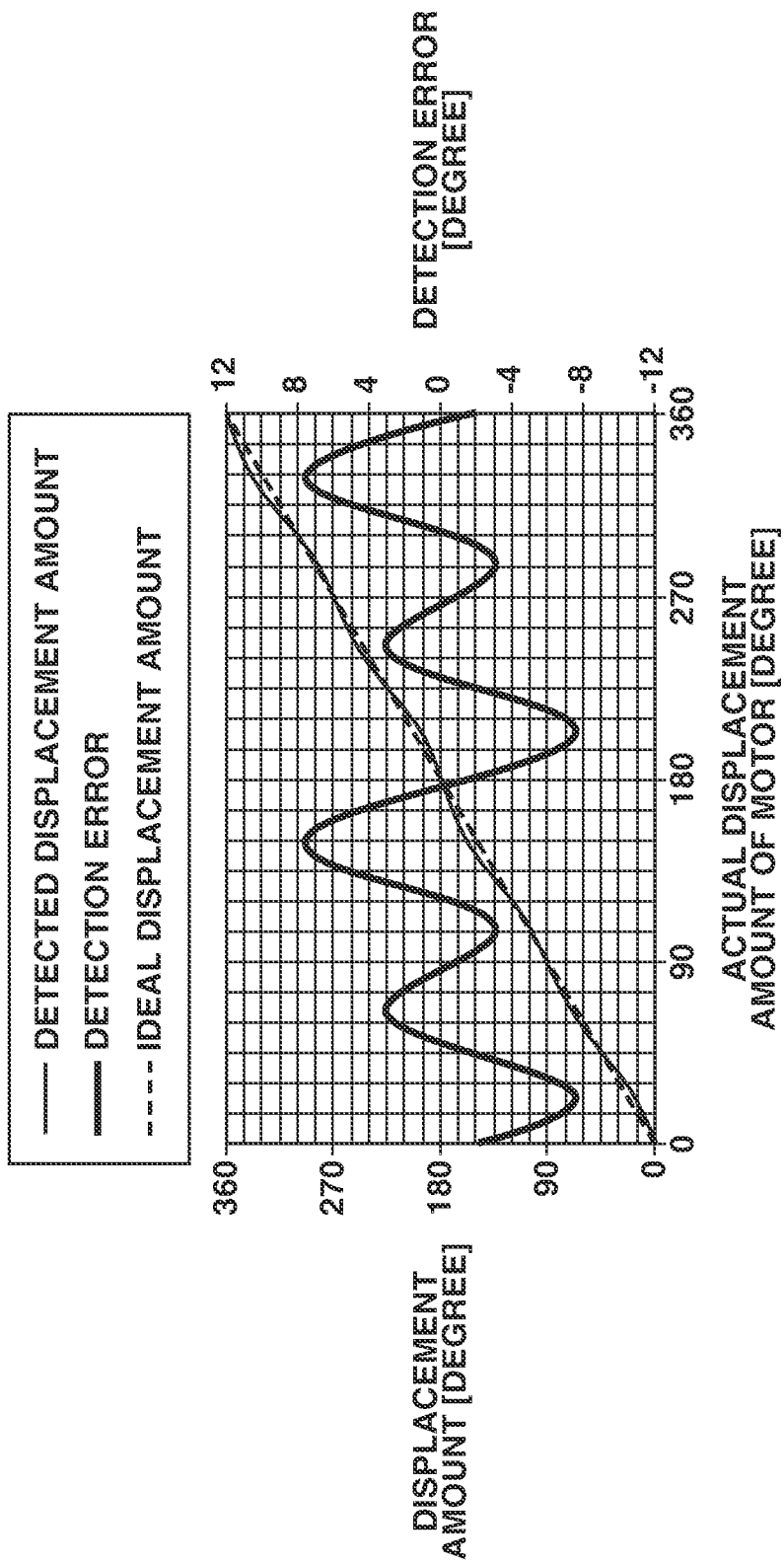
FIG. 17 illustrates a calculation result in a case where no correction is made in the third example embodiment.
Figure 18:
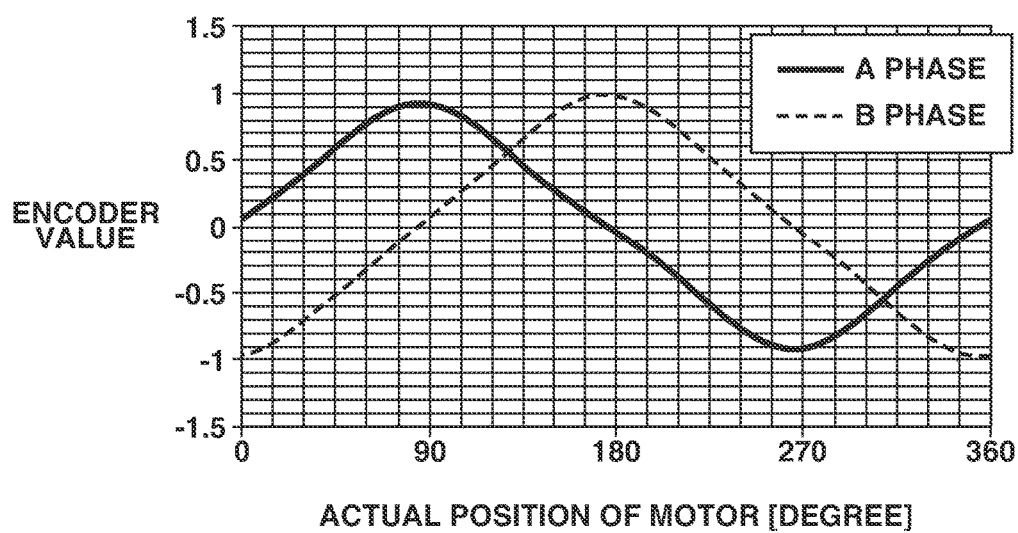
FIG. 18 illustrates a waveform of an encoder signal including a harmonic distortion according to the third example embodiment.
Figure 19:
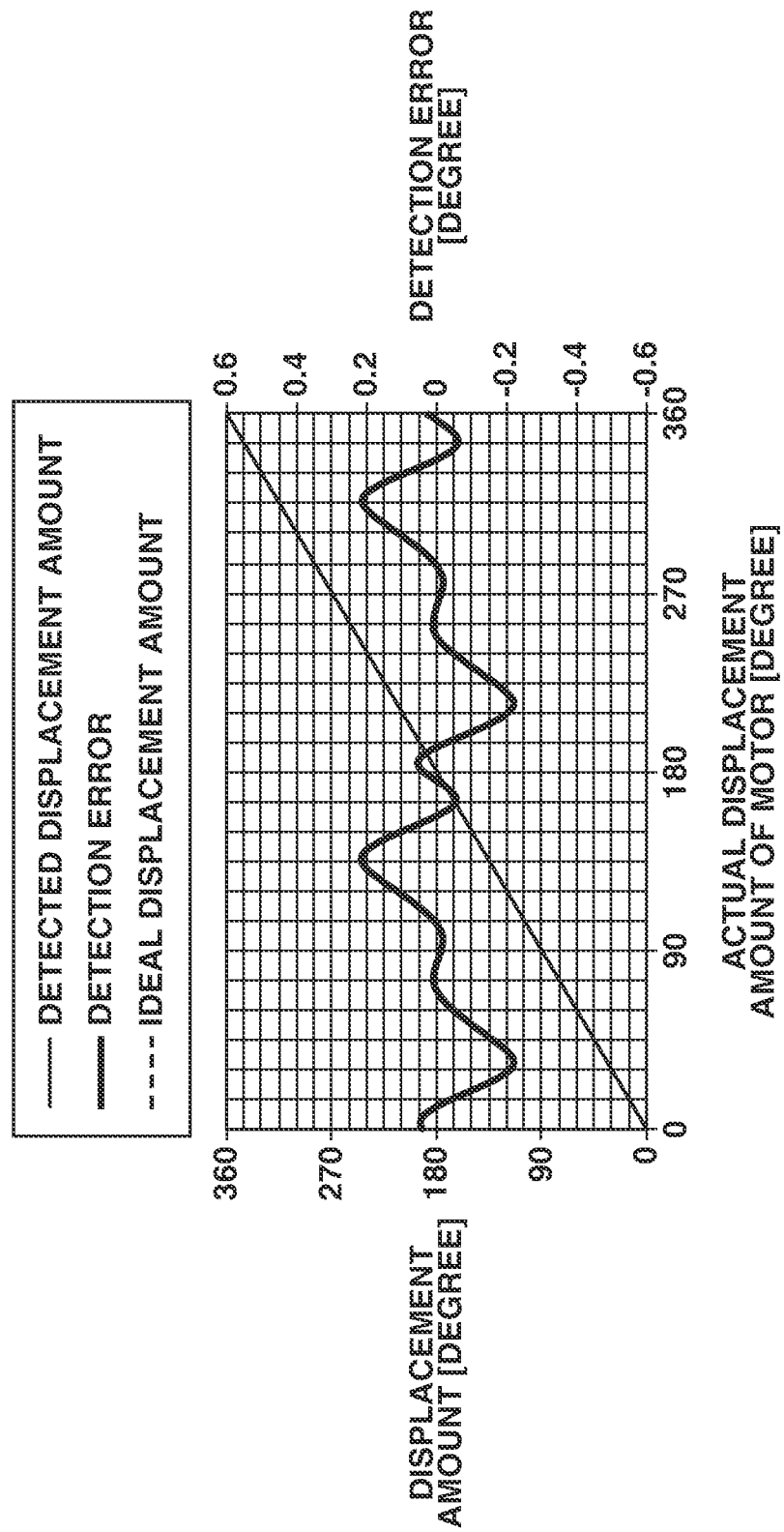
FIG. 19 illustrates a calculation result according to the third example embodiment.

FIG. 17 illustrates the result of the calculation with no correction made and FIG. 19 illustrates the result of the calculation according to the third example embodiment when an encoder signal illustrated in FIG. 18 is input. FIG. 19 illustrates a result of the calculation when the intensity $a_1$ of the fundamental frequency component of the A phase is 0.94, the intensity $b_i$ of the fundamental frequency component of the B phase is 0.90, the intensity $a_3$ of the third harmonic component of the A phase is 0.055, the intensity $b_3$ of the third harmonic component of the B phase is 0.11. While the detection error is approximately ±8 degrees when no correction is made, the detection error considerably reduces to approximately ±0.2 degrees according to the third example embodiment. As a result, the detected displacement amount also almost matches the ideal displacement amount (they appear to overlap on the graph).

The present example embodiment changes the discriminant used by the rotational direction determination unit 601 according to an assumed theoretical formula of the encoder signal, thereby achieving flexible adaptability. Further, the present example embodiment can also be extended to a configuration capable of removing a high harmonic component similarly to the second example embodiment. This extension can be realized by the method described above in the description of the second example embodiment, and a description of the configuration for removing a high harmonic component with respect to the third example embodiment will be omitted herein.

In a fourth example embodiment, another configuration of the arctangent calculation unit 304 will be described. The arctangent calculation unit 304 according to the present example embodiment is configured for reducing a calculation load on the rotational direction determination unit. The process for determining the rotational direction based on the discriminant is a part of the CORDIC rotational calculation, and is iteratively performed. Therefore, it is possible to reduce the calculation load on this rotational direction determination unit, more specifically, perform this process only by an addition/subtraction, which allows the arctangent calculation to be carried out at an improved calculation speed as a result thereof. In the following description, mainly, differences from the first example embodiment and the third example embodiment will be described.

<Configuration of Arctangent Calculation Unit in Consideration of Harmonic Component>

Figure 7:
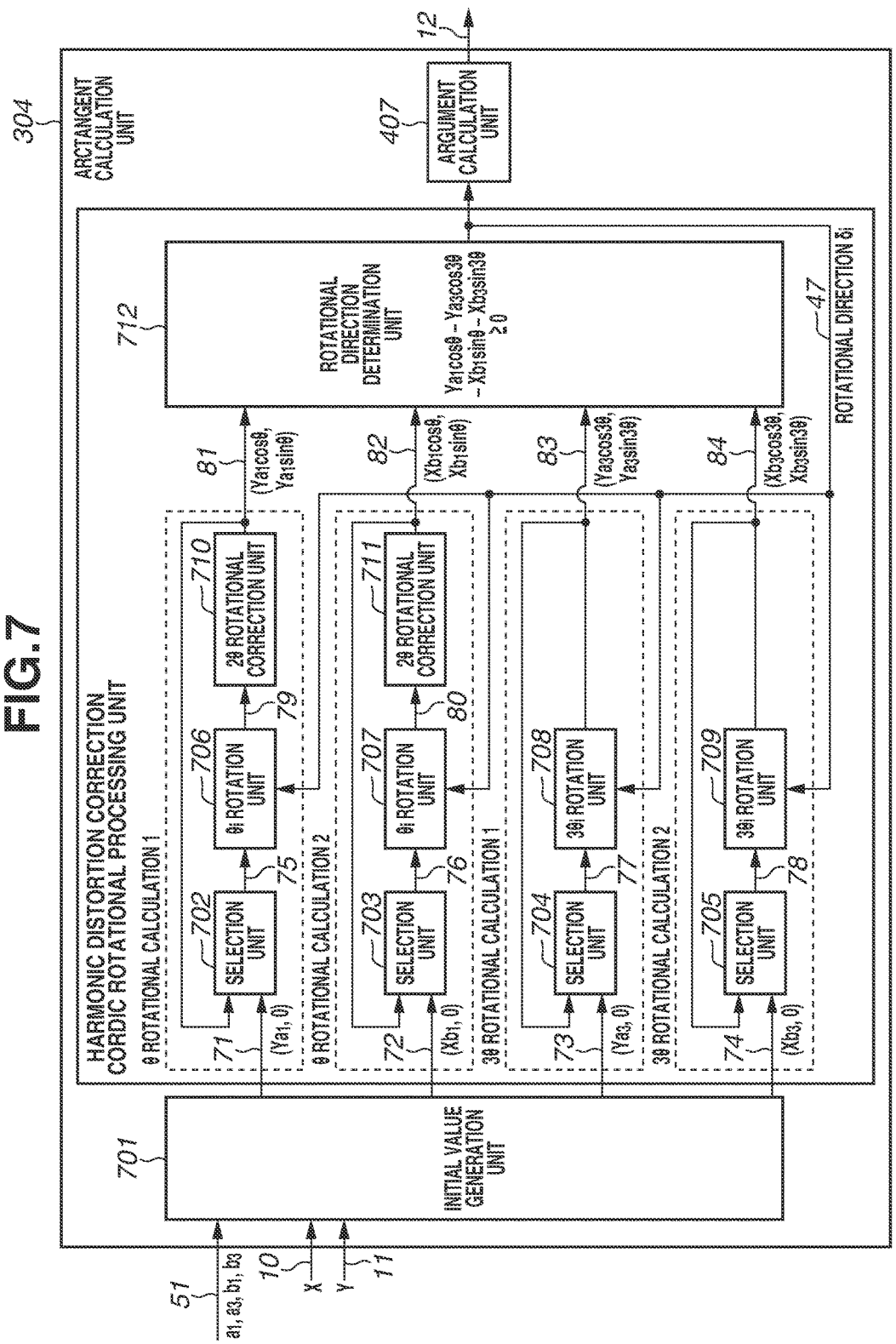
FIG. 7 is a block diagram illustrating a configuration of an arctangent calculation unit according to a fourth example embodiment.

FIG. 7 illustrates a configuration of the arctangent calculation unit 304 using a CORDIC rotational calculation capable of correcting the harmonic distortion as far as the third harmonic distortion according to the present example embodiment. The A-phase data X 10 and the B-phase data Y 11 assumed to be used in the fourth example embodiment are similar to those of the third example embodiment, and are expressed as indicated by the expression (17). Therefore, in the present example embodiment, the arctangent calculation unit 304 is configured to acquire θ satisfying the relational expression expressed by the expression (18) (carry out the arctangent calculation) by the CORDIC rotational calculation method similarly to the third example embodiment.

<Generation of Initial Value of Rotational Calculation>

An initial value generation unit 701 is configured significantly differently from that of the other example embodiments. The intensity information 61 ($a_1$, $a_3$, $b_1$, and $b_3$), which is provided from the superior control unit, and the A-phase data X 10 and the B-phase data Y 11, which are the encoder signal inputs, are fed to the initial value generation unit 701. The initial value generation unit 701 generates four pieces of coordinate data based on these pieces of information, and feeds them to rotational calculations at stages subsequent thereto. More specifically, the initial value generation unit 701 generates and feeds initial coordinate data 71 ($Ya_1$, 0), initial coordinate data 72 ($Xb_1$, 0), initial coordinate data 73 ($Ya_3$, 0), and initial coordinate data 74 ($Xb_3$, 0).

<θ Rotational Calculation>

The θ rotational calculation includes two rotational calculations, i.e., a θ rotational calculation 1 and a θ rotational calculation 2, unlike the other example embodiments. A selection unit 702 forming the θ rotational calculation 1 selects the initial coordinate data 71 ($Ya_1$, 0) at the first rotational calculation in the series of CORDIC calculations, and selects θ rotated coordinate data 81, which is a result of the CORDIC rotational calculation, at the second and subsequent rotational calculations, which is carried out as an iterative calculation. The A-phase data X 10 and the B-phase data Y 11 are updated, and the above-described iterative calculation is cleared when a new arctangent calculation is carried out. Then, this leads to a start of a new CORDIC calculation, in which the updated initial coordinate data 71 ($Ya_1$, 0) is selected again as the first rotational calculation, and the rotated coordinate data 81 is selected after that. The $\theta_i$ rotation unit 706 rotates θ rotation selected coordinate data 75 by the rotational angle of $\theta_i$ in the direction indicated by the rotational direction $\delta_i$ 47. This rotational calculation has the characteristic of the CORDIC rotational calculation, and the rotational calculation expressed by the expression (3) is carried out with respect to the number of the iterative rotational calculation times i. In this expression (3), ($X_{i-1}$, $Y_{i-1}$) is coordinate data input to the $\theta_i$ rotation unit 706, and ($X_i$, $Y_i$) indicates coordinate data output from the $\theta_i$ rotation unit 706. Further, the number of the iterative rotational calculation times i has the values from 0 to m−1, as m represents the final number of the iterative rotational calculation times. Further, in the expression (3), when the number of the iterative rotational calculation times i is zero, ($X_{-1}$, $Y_{-1}$) becomes the coordinate data on the right-hand side, and this corresponds to the initial coordinate data 71 ($Ya_1$, 0) selected by the selection unit 702 as the first rotational calculation. Further, when the number of the iterative rotational calculation times i is zero, the rotational direction $\delta_i$ 47 is fixed to 1 (the positive rotation (the rotation in the leftward direction)), and 1 or −1 (negative rotation (rotation in the rightward direction)) is selected according to a result of a determination made by a rotational direction determination unit 712 after that. A 2θ rotational correction unit 710 corrects a difference in the absolute value due to a difference between the number of times that the rotational calculation is carried out by the $\theta_i$ rotation unit 706, and the numbers of times that the rotational calculation is carried out by a $3\theta_i$ rotation unit 708 and a $3\theta_i$ rotation unit 709, which will be described below. More specifically, the 2θ rotational correction unit 710 carries out the calculation expressed by the expression (5).

In the expression (5), ($X_{in}$, $Y_{in}$) on the right-hand side is rotated coordinate data 79 before the correction that is the output of the $\theta_i$ rotation unit 706, and ($X_{out}$, $Y_{out}$) on the left-hand side is the rotated coordinate data 81 ($Ya_1$ COS θ, $Ya_1$ SIN θ) corrected (updated) by the 2θ rotational correction unit 710. The above-described series of operations corresponds to one iterative rotational calculation in the θ rotational calculation 1 according to the present example embodiment. At this time, as a result of the input of the initial coordinate data 71 as the initial value, the rotated coordinate data 81 ($Ya_1$ COS θ, $Ya_1$ SIN θ) is obtained. The cosine component $Ya_1$ COS θ therein serves as a calculation result corresponding to one of four terms in a discriminant used by the rotational direction determination unit 712, which will be described below. The other rotational calculations (the θ rotational calculation 2, a 3θ rotational calculation 1, and a 3θ rotational calculation 2) are also carried out in a similar manner. Rotation selected coordinate data 76, rotation selected coordinate data 77, and rotation selected coordinate data 78 are selected by a selectin unit 703, a selection unit 704, and a selection unit 705, respectively. Further, they are subjected to the rotational calculations by a $\theta_i$ rotation unit 707, a $3\theta_i$ rotation unit 708, and a $3\theta_i$ rotation unit 709, respectively. Rotated coordinate data 80 before the correction that is subjected to the rotational calculation by the $\theta_i$ rotation unit 707 is corrected by a 2θ rotational correction unit 711, by which rotated coordinate data 82 is obtained. In this manner, the rotated coordinate data 82 ($Xb_1$ COS θ, $Xb_1$ SIN θ), rotated coordinate data 83 ($Ya_3$ COS 3θ, $Ya_3$ SIN 3θ), and rotated coordinate data 84 ($Xb_3$ COS 3θ, $Xb_3$ SIN 3θ) are acquired, respectively.

<Determination of Rotational Direction>

The calculation expression for determining the direction by the rotational direction determination unit 712 according to the present example embodiment is indicated by an expression (21). This expression (21) is an expression in which the fractions are cleared and the divisions are omitted from the expression (20).

$$Ya_1 \cos\theta - Ya_3 \cos 3\theta - Xb_1 \sin\theta - Xb_3 \sin 3\theta \geq 0 \quad (21)$$

Similarly to the other example embodiments, when the expression (21) is true, the rotational direction is determined to be the positive rotation (rotation in the leftward direction), and $\delta_i$ has the value 1. When the expression (21) is false, the rotational direction is determined to be the negative rotation (rotation in the rightward direction), and $\delta_i$ has the value −1. The present example embodiment is characterized in that the four terms on the left-hand side indicated in the expression (21) are contained in the respective results (rotated coordinate data 81, the rotated coordinate data 82, the rotated coordinate data 83, and the rotated coordinate data 84) of the rotational calculations, which are the stages preceding thereto. Therefore, the rotational direction determination unit 712 can determine the rotational direction $\delta_i$ 47 by carrying out only the addition/subtraction and referring to only the positive/negative determination thereof. This means that the CORDIC rotational processing unit for correcting the harmonic distortion is constructed without use of a multiplier. Therefore, this configuration leads to a speedup of the CORDIC rotational processing unit that carries out the iterative rotational calculation.

In the above-described manner, according to the present example embodiment, the CORDIC rotational calculation processing unit can be constructed without use of a multiplier. While realizing such a configuration, the present example embodiment allows the execution of the arctangent calculation that removes the harmonic component contained in the encoder output signal as far as the third harmonic, thereby succeeding in obtaining the highly accurate detected position in which the detection error due to the third harmonic component is removed (corrected) as a result thereof. The result of the calculation according to the present example embodiment is similar to that of the third example embodiment, and is acquired as illustrated in FIG. 19. Further, the present example embodiment can also be extended to a configuration capable of removing a high harmonic component similarly to the second example embodiment. This extension can be realized by the method described above in the description of the second example embodiment, and a description of the configuration for removing a high harmonic component with respect to the present example embodiment will be omitted herein.

A fifth example embodiment relates to an example application as a filter for removing the harmonic distortion in the CORDIC rotational calculation configured in consideration of the harmonic component that has been described in the other example embodiments, and the present example application will be described now.

Figure 8:
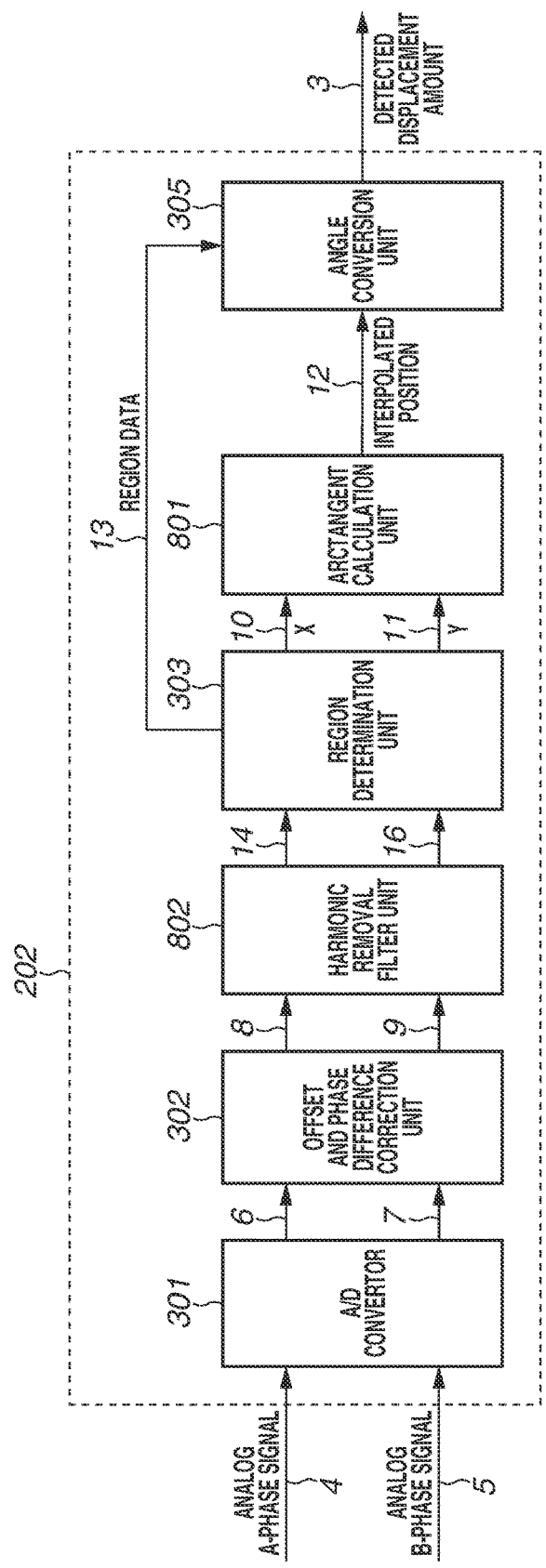
FIG. 8 is a block diagram illustrating a configuration of a displacement detection unit according to a fifth example embodiment.

FIG. 8 illustrates one example of a configuration of a displacement detection unit according to the fifth example embodiment.

An arctangent calculation unit 801 has the arctangent calculation function but does not have the function of removing the harmonic component, different from the configurations described in the descriptions of the other example embodiments. This is a configuration of the normal arctangent calculation using CORDIC. A large difference from the first example embodiment is that this arctangent calculation unit 801 includes a harmonic removal filter unit 802. In the present example embodiment, because the arctangent calculation unit 801 does not calculate the harmonic component, the harmonic removal filter unit 802, which is a stage preceding thereto, performs processing for removing the harmonic component.

FIG. 9 illustrates a configuration of the harmonic removal filter unit 802. The harmonic removal filter unit 802 is configured approximately similarly to the arctangent calculation unit 304 according to the first example embodiment. A basic operation thereof is similar to the operation described in the description of the first example embodiment. A change therefrom is that the harmonic removal filter unit 802 is configured in such a manner that the argument calculation unit 407 is removed therefrom, and the rotated coordinate data 48 (COS θ, SIN θ), which is the calculation result of the θ rotational calculation, is output instead of the output of the rotational angle θ. The cosine component (COS θ) and the sine component (SIN θ) of the rotated coordinate data 48 correspond to harmonic component removed X data 14 and harmonic component removed Y data 16, respectively. As a result of the series of iterative rotational calculations according to the present example embodiment, the rotated coordinate data 48 (COS θ, SIN θ), which is the fundamental frequency component, and the rotated coordinate data 49 (COS 3θ, SIN 3θ), which is the third harmonic component, can be acquired as an accompanying outcome. With use of this effect, the harmonic removal filter unit 802 is caused to function as a signal filter for extracting only the fundamental frequency component, i.e., removing the third harmonic component, which is a characteristic of the present example embodiment.

Figure 20:
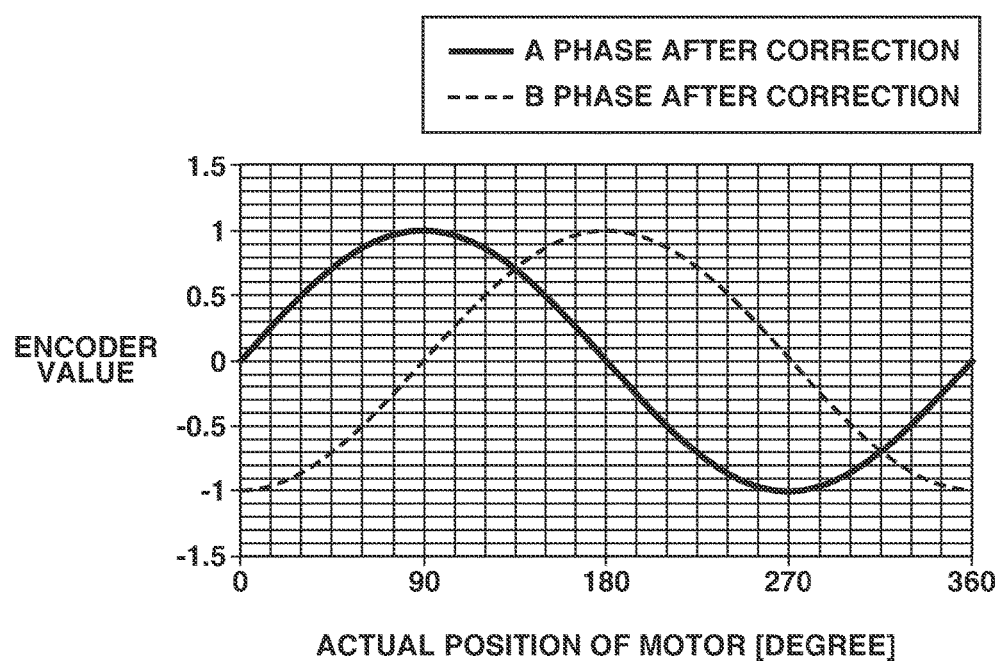
FIG. 20 illustrates a calculation result according to the fifth example embodiment.

In the above-described manner, according to the present example embodiment, it is possible to provide an information processing apparatus of the encoder that has the filter function of removing the third harmonic component contained in each of the A-phase and B-phase signals. FIG. 20 illustrates a result of performing the signal processing according to the fifth example embodiment on the encoder signal containing the harmonic component therein that is illustrated in FIG. 14. As illustrated in FIG. 20, it can be confirmed that the third harmonic component is removed and a highly accurate signal containing only the fundamental frequency component therein can be acquired. The present example embodiment can also be configured to employ the detailed configurations of the other example embodiments. More specifically, the present example embodiment can be configured to be able to remove a high harmonic component similarly to the second example embodiment, configured to work when the intensities of the fundamental frequency and the harmonic component are different between the A phase and the B phase similarly to the third example embodiment, and configured not to include the multiplier similarly to the fourth example embodiment. Theses configurations are arranged as described in the description of each of the example embodiments, and detailed descriptions thereof will be omitted herein.

Other Example Embodiments

The above-described example embodiments have been described as the example embodiments using the CORDIC calculation algorithm even for the calculation of the harmonic component, since the arctangent calculation is carried out based on the CORDIC calculation algorithm as a basic principle thereof. However, even use of another method for the calculation of the harmonic component is not a deviation from the spirit of the present invention. For example, the result of the basic rotational calculation acquired from the CORDIC rotational calculation (rotated coordinate data from the θ rotational calculation) can be converted into the rotated coordinate data subjected to the 3θ rotational calculation with use of a triple-angle formula of a trigonometric function. These pieces of rotated coordinate data may be input to the direction determination unit, and the direction determination unit may determine the direction of the next rotational calculation.

Further, the above-described example embodiments are configured as the recursive processing-type configuration that performs the operation of the iterative rotational calculation processing a plurality of times with use of the single rotation unit. However, the above-described example embodiments can also be realized even by a pipeline processing-type configuration that includes a plurality of stages of rotation units in the same rotational calculation unit, connects them in a pipeline manner, and performs the operation of the rotational calculation processing. The above-described motor control apparatus 1000 can be used for a pan head of, for example, a network camera and a stage of a manufacturing apparatus, and improve smoothness of an operation of the pan head. The network camera includes a central processing unit (CPU), a read only memory (ROM), a random access memory (RAM), an imaging unit, the pan head, and a network interface.

Further, the above-described example embodiments have been described assuming that the two-phase encoder signals for detecting the position, each of which contains the harmonic component therein. However, the applicability of the above-described example embodiments is not limited to the encoder signal, and the above-described example embodiments can also be applied to all kinds of two-phase signals containing the harmonic component therein.

For example, the two-phase signals corresponding to the motor rotational angle can be detected from a driving current when a three-phase brushless motor is driven. In other words, the motor rotational angle can be calculated by arctan (ATAN) processing from the detected two-phase signals.

It is known that the harmonic component is superposed on these two-phase signals. Therefore, applying the present example embodiment can eliminate the influence of the harmonic component in the two-phase signals, thereby allowing detection of a correct motor rotational angle.

Figure 21:
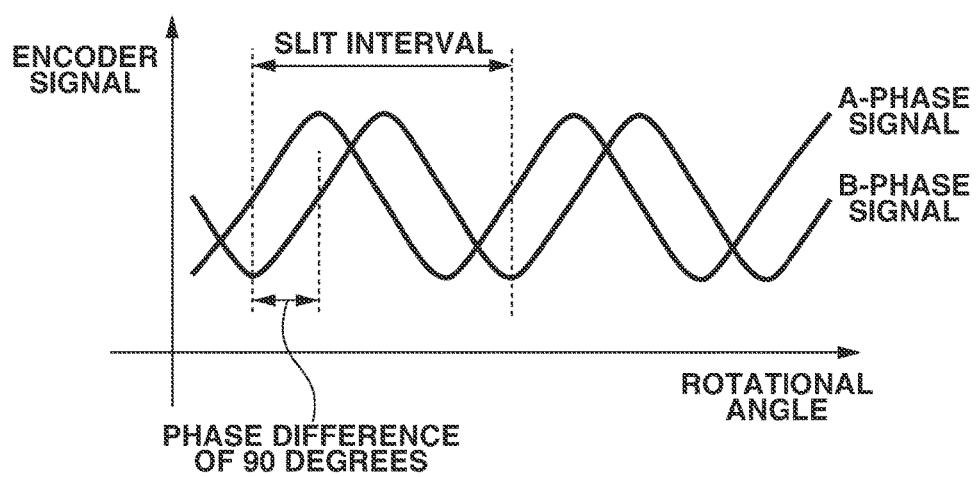
FIG. 21 illustrates output signals having two phases that are output by an optical encoder.

FIG. 21 illustrates an A-phase signal and a B-phase signal having two phases that are output from an optical encoder mounted on a motor according to a sixth example embodiment of the present invention. The A-phase signal and the B-phase signal are a cosine wave and a sine wave out of phase with each other by 90 degrees. For example, the motor can measure a rotational position of the motor period by period in the sine wave by counting the sine-wave signal as a pulse. Further, the motor can detect what number period the position is in and how much degrees the phase of the position is, by detecting the phases of the sine wave and the cosine wave. The accuracy with which the motor rotational position is detected is determined according to accuracy with which the phase is detected, which raises a necessity of correctly detecting the phase. However, the actual signal output from the encoder contains the harmonic superposed thereon, and therefore cannot be the ideal sine wave and cosine wave. However, the waveform of the output signal can be regarded as an almost symmetric waveform in light of the mechanism according to which the output signal is generated. When the waveform of the output signal is the symmetric waveform, the superposed harmonic is limited to an odd harmonic. Further, as the order of the harmonic increases, power of the output signal drastically reduces. Therefore, the first priority is placed on the phase detection in consideration of the third harmonic, and then next priority is placed on the phase detection in consideration of the harmonics as far as the fifth harmonic. A configuration for them will be described now.

Figure 22:
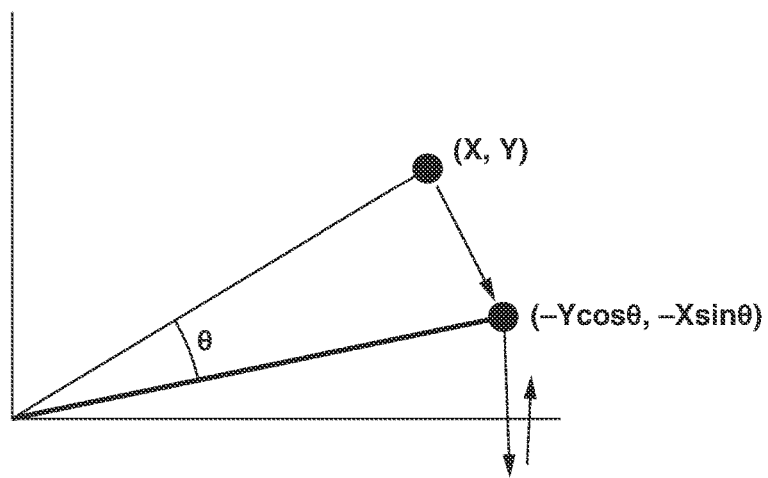
FIG. 22 illustrates an operation of a vectoring mode of a COordinate Rotation DIgital Computer (CORDIC).

FIG. 22 illustrates an operation of a vectoring mode of a CORDIC. The CORDIC is an apparatus that carries out the rotational calculation of the coordinate data. The CORDIC calculates an argument of input two-dimensional vector data (X, Y) with use of the CORDIC rotational calculation in the vectoring mode. The CORDIC sequentially rotates the two-dimensional vector data (X, Y) toward an x axis according to a predetermined rotational angle sequence $\theta_i = \tan^{-1}(2^{-i})$ to allow the rotated vector to approximately coincide with the x axis in the end, and then determines that this cumulated rotational angle $\theta_n$ is the argument. Now, i is i=0, 1, 2, . . . . The cumulated rotational angle $\theta_n$ is a value acquired by cumulatively adding the rotational angle sequence $\theta_i$ while taking a rotational direction determined for each rotation into consideration, i.e., the cumulated rotational angle $\theta_n$ is calculated by $\theta_n = \Sigma \text{sign}(Y_i) \cdot \theta_i$. In this expression, sign($Y_i$) indicates, with ±1, a positive or negative sign of a y-axis component in the two-dimensional vector data when rotated by $\theta_i$, and the two-dimensional vector data is rotated in a rightward direction if sign($Y_i$) is +1 and a leftward direction if sign($Y_i$) is −1.

Figure 23:
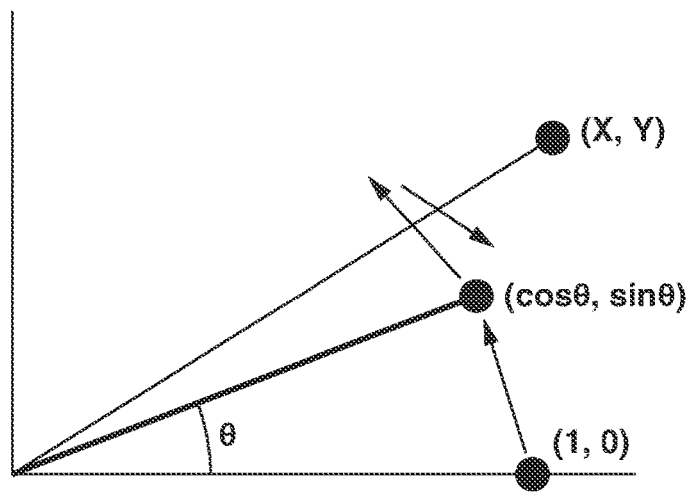
FIG. 23 illustrates how a vector mode function is realized by rotating a reference vector.

FIG. 23 illustrates how the vectoring mode function is realized by rotating a reference vector. In principle, the CORDIC can also acquire the argument as a rotational angle when the reference vector (1, 0) on the x axis is rotated toward the two-dimensional vector data (X, Y) by the CORDIC rotational calculation so that their orientations match each other, unlike the above-described vectoring mode. In other words, (cos θ, sin θ) is acquired as coordinates after this reference vector (1, 0) is rotated by θ in the leftward direction, and a discriminant for determining the next rotational direction is expressed as indicated by the following expression (22).

$$Y/X \geq \sin\theta/\cos\theta \quad (22)$$

The next rotational direction is determined to be the leftward direction if the discriminant (22) is true and the rightward direction if the discriminant (22) is false. However, generally, such an expression is not likely to be used in the calculation of the argument by the CORDIC. This is because the discriminant (22) requires a division, and undesirably leaves a multiplication even if the denominator in the discriminant (22) is transported, thereby being unable to be replaced with the simple calculation that is the characteristic of the CORDIC, i.e., a bit shift calculation and an addition/subtraction calculation.

However, in the present example embodiment, the discriminant (22) is highly useful. This is because the CORDIC according to the present example embodiment is characterized by extension of this discriminant (22) to the signal with the harmonic superposed thereon, and use of an expression acquired by transforming that into a discriminant for the vectoring mode. When the discriminant (22) is first transformed into the discriminant for the vectoring mode before being extended to the signal with the harmonic superposed thereon, the discriminant (22) is modified as indicated by the following expression (23).

$$-X\sin\theta + Y\cos\theta \geq 0 \quad (23)$$

The discriminant (23) can be interpreted as an expression for determining whether or not the y-axis component is zero or larger when the vector (X, Y) is rotated by θ in the rightward direction, i.e., whether the rotated vector exceeds the x axis, as illustrated in FIG. 22. This discriminant (23) is a discriminant itself in the vectoring mode of the CORDIC.

Because the discriminant (23) is used to rotate the input two-dimensional vector (X, Y) while the discriminant (22) is used to rotate the reference vector (1, 0), the respective rotational directions are set to directions opposite from each other with the same result of the determination. In this manner, it can be understood that the discriminant (23) for the vectoring mode can be acquired from the discriminant (22) for the rotation of the reference vector.

Then, the discriminant (22) is extended to the signal with the third harmonic superposed thereon. Assuming that the amplitude values of the fundamental frequency and the third harmonic are known information a and β, respectively, a discriminant when the third harmonic is superposed on the fundamental frequency is expressed as indicated by the following expression (24).

$$Y/X \geq (\alpha \sin\theta + \beta \sin 3\theta)/(\alpha \cos\theta - \beta \cos 3\theta) \quad (24)$$

Numerators on both sides in the discriminant (24) correspond to a sine-wave phase component of the signal with the third harmonic superposed thereon, and denominators on the both sides in the discriminant (24) correspond to a cosine-wave phase component of the signal with the third harmonic superposed thereon. Then, θ when the right-hand side and the left-hand side are equal to each other in the expression (24) is the argument $\theta_n$ that should be acquired. A − sign is placed in front of β in the denominator on the right-hand side because the phase difference of the cosine wave is 90 degrees in the fundamental frequency but is turned into a phase difference of 270 degrees, i.e., a phase difference of −90 degrees in the third harmonic. For this reason, the apparent rotational direction of the third harmonic becomes opposite to the direction of the fundamental frequency.

The determination of the rotational direction according to the discriminant (24) proceeds in the following manner. If the discriminant (24) is true, the rotation is still insufficient, so that each of a fundamental frequency reference vector (α, 0) and a third harmonic reference vector (β, 0) is further rotated in an initial direction. On the other hand, if the discriminant (24) is false, the rotation is excessive, so that each of the fundamental frequency reference vector (α, 0) and the third harmonic reference vector (β, 0) is rotated in an opposite direction. Further, when the fundamental frequency reference vector (α, 0) is rotated according to the rotational angle sequence $\theta_i$, the third harmonic reference vector (β, 0) is rotated by $3\theta_i$, which is three times as large as that. This is theoretical processing based on the discriminant (24), and, actually, the following processing is performed.

When the discriminant (24) is transformed into the discriminant for the vectoring mode similarly to the transform of the discriminant (22) into the discriminant (23) for the vectoring mode, the discriminant (24) is modified as indicated by the following expression (25).

$$Y(\alpha\cos\theta - \beta\cos 3\theta) \geq X(\alpha\sin\theta + \beta\sin 3\theta)$$

$$\alpha Y\cos\theta - \beta Y\cos 3\theta \geq \alpha X\sin\theta + \beta X\sin 3\theta$$

$$(-\alpha X\sin\theta + \alpha Y\cos\theta) - (\beta X\sin 3\theta + \beta Y\cos 3\theta) \geq 0 \quad (25)$$

An expression in the left-side first parentheses and an expression in the second parentheses on a left-hand side in the discriminant (25) correspond to a rightward e rotation of the fundamental frequency component and a leftward 3θ rotation of the third harmonic component in the input two-dimensional vector data, respectively. The fundamental frequency component and the third harmonic component are mixed in each element in the input two-dimensional vector (X, Y), which means that the third harmonic component is mixed in the first parentheses and the fundamental frequency component is mixed in the second parentheses on the left-hand side in the discriminant (25). Theses mixed components are each an unnecessary component, but can be ignored because becoming zero by being canceled out at the time of the final stage of the rotation, i.e., when the input two-dimensional vector is rotated and coincides with the x axis at the destination of the rotation. It can be confirmed from a calculation that these mixed components are canceled out, but a description of this calculation will be omitted herein. This is because it can be said that the fact that the discriminant (25) can be acquired from the transform of the other discriminant guarantees that these unnecessary components are actually cancelled out.

The control of the rotational direction according to the discriminant (25) functions in the following manner. If the discriminant (25) is true, the rotation is still insufficient, so that the CORDIC further rotates each of fundamental frequency coordinates ($\alpha X$, $\alpha Y$) and third harmonic coordinates ($\beta X$, $\beta Y$) in the initial direction. On the other hand, if the discriminant (25) is false, the CORDIC rotates each of the fundamental frequency coordinates ($\alpha X$, $\alpha Y$) and the third harmonic coordinates ($\beta X$, $\beta Y$) in the opposite direction. The description so far has been focused on the principle of the CORDIC based on the discriminant (25).

Figure 24A:
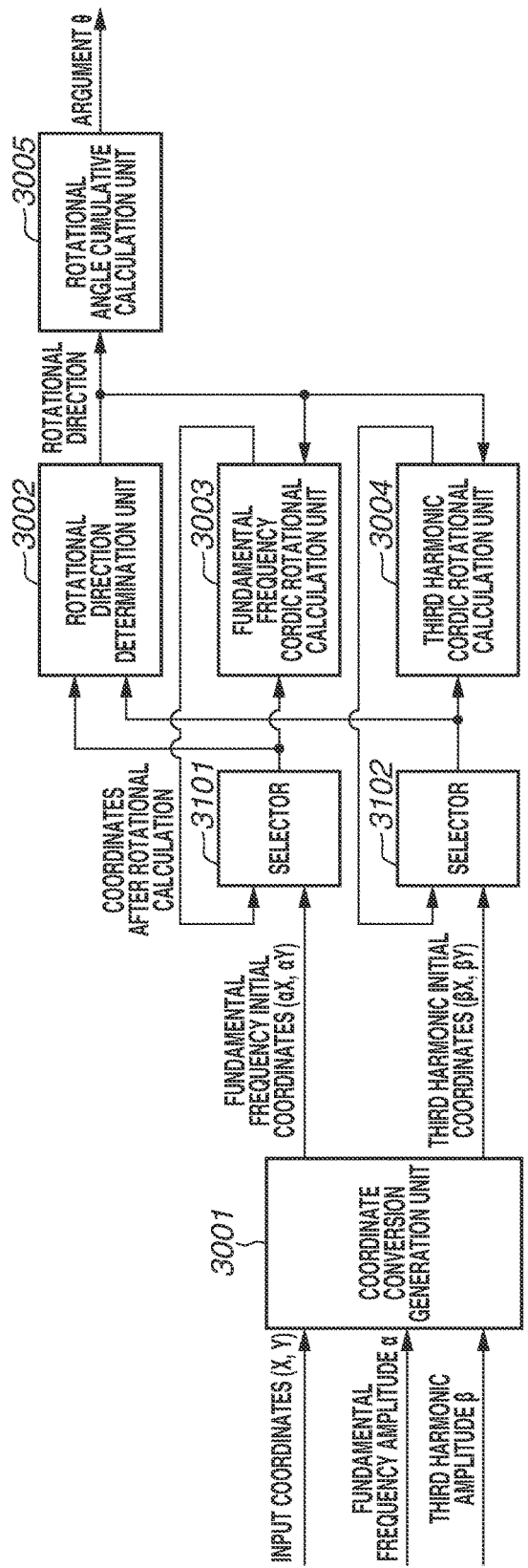
FIGS. 24A and 24B each illustrate an example of a configuration of a CORDIC according to a sixth example embodiment.

FIG. 24A is a block diagram illustrating an example of the configuration of the CORDIC according to the present example embodiment, and realizes the principle of the above-described CORDIC. The CORDIC is the apparatus that carries out the rotational calculation of the coordinate data, and includes a coordinate conversion generation unit 3001, a rotational direction determination unit 3002, a fundamental frequency CORDIC rotational calculation unit 3003, a third harmonic CORDIC rotational calculation unit 3004, a rotational angle cumulative calculation unit 3005, and selectors 3101 and 3102. The coordinate conversion generation unit 3001 inputs the input two-dimensional coordinate data (X, Y), the fundamental frequency amplitude $\alpha$, and the third harmonic amplitude $\beta$, and generates the fundamental frequency coordinate data ($\alpha X$, $\alpha Y$) to which the basic rotation is applied, and the third harmonic coordinate data ($\beta X$, $\beta Y$) to which the threefold rotation is applied. The fundamental frequency CORDIC rotational calculation unit 3003 is a rotational calculation unit for the fundamental frequency, and causes the basic rotation of the fundamental frequency coordinate data. The third harmonic CORDIC rotational calculation unit 3004 is a rotational calculation unit for the third harmonic, and causes the threefold rotation of the third harmonic coordinate data. The rotational direction determination unit 3002 refers to pieces of data input to the two CORDIC rotational calculation units 3003 and 3004, and determines the rotational direction of these pieces of input data based on the discriminant (25). The rotational angle cumulative calculation unit 3005 is a unit that cumulatively adds the rotational angle, and cumulatively adds the rotational angle in the fundamental frequency CORDIC rotational calculation unit 3003.

Next, a method for carrying out the rotational calculation of the coordinate data by the CORDIC will be described. The coordinate conversion generation unit 3001 multiplies the input two-dimensional coordinate data (X, Y) by the fundamental frequency amplitude value $\alpha$ measured in advance, and outputs the fundamental frequency initial coordinate data ($\alpha X$, $\alpha Y$) to the selector 3101. Further, the coordinate conversion generation unit 3001 multiplies the input two-dimensional coordinate data (X, Y) by the third harmonic amplitude value $\beta$ measured in advance, and outputs the third harmonic initial coordinate data ($\beta X$, $\beta Y$) to the selector 3102. The selector 3101 is a selector for the fundamental frequency, and selects the fundamental frequency initial coordinate data ($\alpha X$, $\alpha Y$) and outputs this data to the fundamental frequency CORDIC rotational calculation unit 3003 at the first calculation (i=0). The selector 3102 is a selector for the third harmonic, and selects the third harmonic initial coordinate data ($\beta X$, $\beta Y$) and outputs this data to the third harmonic CORDIC rotational calculation unit 3004 at the first calculation (i=0). Further, the selector 3101 selects fundamental frequency rotated coordinate data output from the fundamental frequency CORDIC rotational calculation unit 3003 and outputs this data to the fundamental frequency CORDIC rotational calculation unit 3003 at the second and subsequent calculations (i=1 or larger). The selector 3102 selects third harmonic rotated coordinate data output from the third harmonic CORDIC rotational calculation unit 3004 and outputs this data to the third harmonic CORDIC rotational calculation unit 3004 at the second and subsequent calculations (i=1 or larger).

The rotational direction determination unit 3002 is a rotational direction determination unit, and determines the rotational direction of the CORDIC rotational calculation units 3003 and 3004 with use of the discriminant (25) based on the pieces of coordinate data selected by the selectors 3101 and 3012. The fundamental frequency CORDIC rotational calculation unit 3003 rotates the coordinate data output from the selector 3101 according to the rotational angle sequence $\theta_i$ in the rotational direction determined by the rotational direction determination unit 3002, and outputs the fundamental frequency rotated coordinate data to the selector 3101. More specifically, the fundamental frequency CORDIC rotational calculation unit 3003 rotates the coordinate data by the rotational angle of $\tan^{-1}(2^{-i})$ in an i-th cycle (i is zero or a larger integer). The third harmonic CORDIC rotational calculation unit 3004 rotates the coordinate data output from the selector 3102 in the rotational direction determined by the rotational direction determination unit 3002 by $3\theta_i$, which is three times as large as the rotational angle sequence $\theta_i$, and outputs the third harmonic rotated coordinate data to the selector 3102. More specifically, the third harmonic CORDIC rotational calculation unit 3004 rotates the coordinate data by the rotational angle of $3 \times \tan^{-1}(2^{-i})$ in the i-th cycle. In other words, the third harmonic CORDIC rotational calculation unit 3004 rotates the coordinate data by a rotational angle that is acquired by multiplying the rotational angle used by the fundamental frequency CORDIC rotational calculation unit 3003 by the order of the harmonic (three).

As the CORDIC rotational calculation units 3003 and 3004 each iteratively carry out the rotational calculation, the rotated coordinate data output from each of the CORDIC rotational calculation units 3003 and 3004 eventually coincides approximately with the x axis. The remaining difference between the rotated coordinate data and the x axis depends on the number of times that the rotational calculation is iteratively carried out and the number of calculated bits, and reduces as the number of times that the rotational calculation is iteratively carried out and the number of calculated bits increases. The rotational angle cumulative calculation unit 3005 cumulatively adds the rotational angle by which the coordinate data is rotated by the CORDIC rotational calculation unit 3003 based on the rotational direction determined by the rotational direction determination unit 3002, thereby converging the rotational angle to the argument $\theta n$ of the vector of the fundamental frequency in the two-dimensional coordinate data. In this manner, the CORDIC inputs the two-dimensional coordinate data including the fundamental frequency and the third harmonic, and calculates the argument en of the vector of the fundamental frequency in the two-dimensional coordinate data.

Next, the determination of the rotational direction by the rotational direction determination unit 3002 will be described. Immediately before the CORDIC rotational calculation units 3003 and 3004 each carry out the first CORDIC rotational calculation according to the rotational angle sequence $\theta_i$, the rotational direction determination unit 3002 inputs the two pieces of y-axis component data αY and βY generated by the coordinate conversion generation unit 3001, and calculates a difference αY−βY therebetween. Then, the rotational direction determination unit 3002 determines the rotational direction of the first rotation based on whether or not this difference αY−βY is zero or larger. The CORDIC rotational calculation units 3003 and 3004 rotate the pieces of coordinate data by $\theta_i$ (i=0) and $3\theta_i$ (i=0) in the rotational direction determined by the rotational direction determination unit 3002, respectively, and output the pieces of rotated coordinate data. The selectors 3101 and 3102 select the pieces of rotated coordinate data generated by the CORDIC rotational calculation units 3003 and 3004, and output these pieces of data to the CORDIC rotational calculation units 3003 and 3004, respectively. Next, the CORDIC rotational calculation units 3003 and 3004 each carry out the second rotation. The rotational direction determination unit 3002 determines the rotational direction of the second rotation according to whether or not a difference between y-axis components that is calculated by the following expression (26) is zero or larger.

$$\begin{bmatrix} \cos\theta_i & \sin\theta_i \\ -\sin\theta_i & \cos\theta_i \end{bmatrix} \begin{bmatrix} \alpha X \\ \alpha Y \end{bmatrix} - \begin{bmatrix} \cos 3\theta_i & -\sin 3\theta_i \\ \sin 3\theta_i & \cos 3\theta_i \end{bmatrix} \begin{bmatrix} \beta X \\ \beta Y \end{bmatrix} = - \quad (26)$$

$$[-\alpha X \sin\theta_i + \alpha Y \cos\theta_i - \beta X \sin 3\theta_i - \beta Y \cos 3\theta_i]$$

Two rotational calculations on a left-hand side in the expression (26) are carried out by the CORDIC rotational calculation units 3003 and 3004, respectively. A difference between y-axis components in results of two rotational calculations indicated on a right-hand side is equal to a difference on the left-hand side in the discriminant (25). By that, it is clarified that the configuration of the CORDIC illustrated in FIG. 24A corresponds to the discriminant (25).

Regarding the rotational direction of the third and subsequent rotational calculations, the rotational direction determination unit 3002 determines the rotational direction based on the discriminant (25) in a similar manner while replacing $\theta_i$ in the expression (26) with the cumulated rotational angle.

Next, a discriminant in a case where amplitudes of the sine wave and the cosine wave are different between the fundamental frequency and the third harmonic will be described. Assuming that α and α' represent the amplitudes of the sine wave and the cosine wave of the fundamental frequency and β and β' represent the amplitudes of the sine wave and the cosine wave of the third harmonic, the discriminants (24) and (25) are modified as indicated by the following expressions (27) and (28), respectively.

$$Y/X \geq (\alpha \sin \theta + \beta \sin 3\theta)/(\alpha' \cos \theta - \beta' \cos 3\theta) \quad (27)$$

$$(-\alpha X \sin \theta + \alpha' Y \cos \theta) - (\beta X \sin 3\theta + \beta' Y \cos 3\theta) \geq 0 \quad (28)$$

The coordinate conversion generation unit 3001 inputs two-dimensional (α, α') and (β, β') instead of inputting one-dimensional α and β, and outputs two-dimensional coordinates (αX, α'Y) and (βX, β'Y). Processing after that is similar to the above-described processing. Therefore, it is understood that the present example embodiment can also be easily applied even when the amplitudes of the sine wave and the cosine wave are different between the fundamental frequency and the third harmonic, only by changing the coordinate conversion generation unit 3001 in the above-described manner.

Figure 24B:
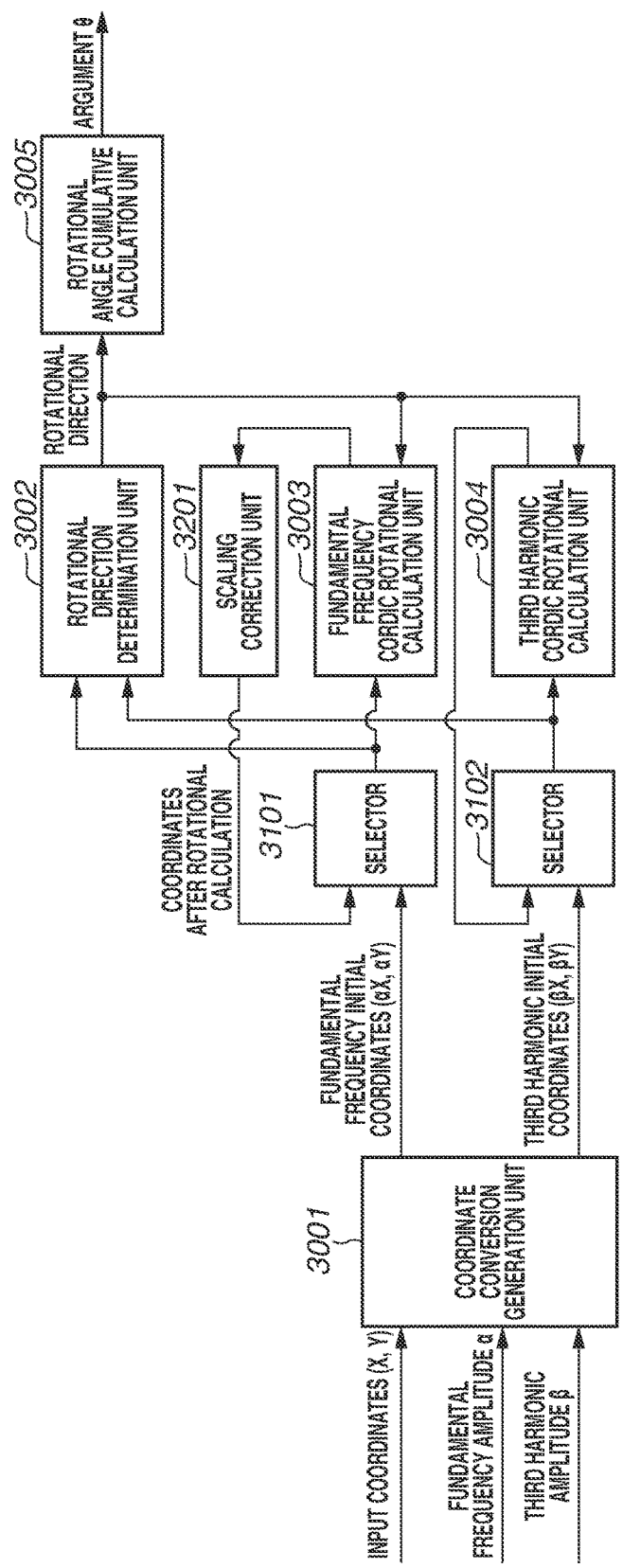

FIG. 24B illustrates an example of another configuration of the CORDIC according to the present example embodiment, and illustrates a configuration in which a scaling correction unit 3201 is added to the configuration of FIG. 24A. The CORDIC rotational calculation units 3003 and 3004 each carry out the coordinate rotation only by the simple bit shift and addition/subtraction, and therefore an absolute value of the vector after the rotation slightly changes. The rotational angle is different between the fundamental frequency and the third harmonic, which leads to a difference between change rates of the absolute values of the vectors of them, undesirably making it impossible to simply add the pieces of coordinate data after they are rotated. Therefore, the absolute value(s) of both or one of them should be corrected to make the change rate of the absolute value consistent.

In the CORDIC illustrated in FIG. 24A, if the coordinate data is multiplied by $(1+2^{-2i})$ after the fundamental frequency is rotated by $\theta_i$, this can make the change rate of the absolute value consistent between the fundamental frequency and the third harmonic. This calculation can be carried out with use of only a bit shift and an addition. This is one possible method, and another method may also be employed. Such a calculation for correcting the absolute value of the vector is called a scaling correction. In FIG. 24B, the scaling correction unit 3201 carries out the scaling correction to make the change rate of the absolute value consistent between the respective vectors of the fundamental frequency rotated coordinate data output from the CORDIC rotational calculation unit 3003 and the third harmonic rotated coordinate data output from the CORDIC rotational calculation unit 3004. The scaling correction unit 3201 is a scaling correction unit for the fundamental frequency, and carries out the scaling correction using the bit shift and the addition. In the i-th cycle, the scaling correction unit 3201 multiplies the rotated coordinate data output from the CORDIC rotational calculation unit 3003 by $(1+2^{-2i})$, and outputs a result of this multiplication to the selector 3101 as the fundamental frequency rotated coordinate data. When i is i=1 or larger, the selector 3101 selects the data output from the scaling correction unit 3201, and outputs this data to the CORDIC rotational calculation unit 3003.

Now, in the case of the CORDIC that rotates only the fundamental frequency with no harmonic superposed thereon, the scaling correction unit 3201 does not have to carry out the scaling correction for each rotational calculation, and can achieve the intended correction by collectively carrying out the scaling correction only once before or after all of the rotational calculations. Therefore, the scaling correction is often carried out together with another calculation carried out before or after the CORDIC calculation. In this case, the scaling correction unit 3201 is not explicitly indicated like the illustration in FIG. 24A. Therefore, the CORDIC expressing an aspect of the present example embodiment is represented by the illustration in FIG. 24A, in which the scaling correction unit 3201 is omitted. On the other hand, the CORDIC adapted to the actual processing is represented by the illustration in FIG. 24B, in which the scaling correction unit 3201 is included.

In the sixth example embodiment, the superposed harmonic is only the third harmonic, but the fifth or higher harmonic is also superposed in the actual apparatus. However, the power of the harmonic drastically attenuates as the order of the harmonic increases, so that in some cases the fifth or higher harmonic may be able to be ignored. Conversely, in a case where highly accurate measurement is specified, a further high harmonic should also be processed without being ignored according to this accuracy. Then, in a seventh example embodiment of the present invention, a configuration that processes the harmonics as far as the fifth harmonic as the further high harmonic will be described.

First, the above-described discriminant (24) is extended to a discriminant including the fifth harmonic. Assuming that the amplitude of the fifth harmonic is γ, the discriminant (24) is modified as indicated by the following expression (29).

$$Y/X \geq (\alpha \sin \theta + \beta \sin 3\theta + \gamma \sin 5\theta)/(\alpha \cos \theta - \beta \cos 3\theta + \gamma \cos 5\theta) \quad (29)$$

Because the phase difference of 90 degrees in the fundamental frequency is turned into a phase difference of 450 degrees and becomes equivalent to the phase difference of 90 degrees in the fifth harmonic, a + sign is placed in front of γ in a denominator on a right-hand side. Then, the rotational direction of the fifth harmonic becomes the same as the direction of the fundamental frequency.

Next, when being transformed into a discriminant for the vectoring mode, the discriminant (29) is modified as indicated by the following expression (30).

$$Y(\alpha \cos \theta - \beta \cos 3\theta + \gamma \cos 5\theta) \geq X(\alpha \sin \theta + \beta \sin 3\theta + \gamma \sin 5\theta) \alpha Y \cos \theta - \beta Y \cos 3\theta + \gamma Y \cos 5\theta \geq \alpha X \sin \theta + \beta X \sin 3\theta + \gamma X \sin 5\theta(-\alpha X \sin \theta + \alpha Y \cos \theta) - (\beta X \sin 3\theta + \beta Y \cos 3\theta) + (-\gamma X \sin 5\theta + \gamma Y \cos 5\theta) \geq 0 \quad (30)$$

An expression in the third parentheses on a left-hand side in the discriminant 30 is a new term for rotating the fifth harmonic component in the rightward direction by 5θ. This new term is an unnecessary component for each of the first to third parentheses, but they are canceled out to become zero when the input two-dimensional vector is rotated and coincides with the x axis at the destination of the rotation.

Figure 25A:
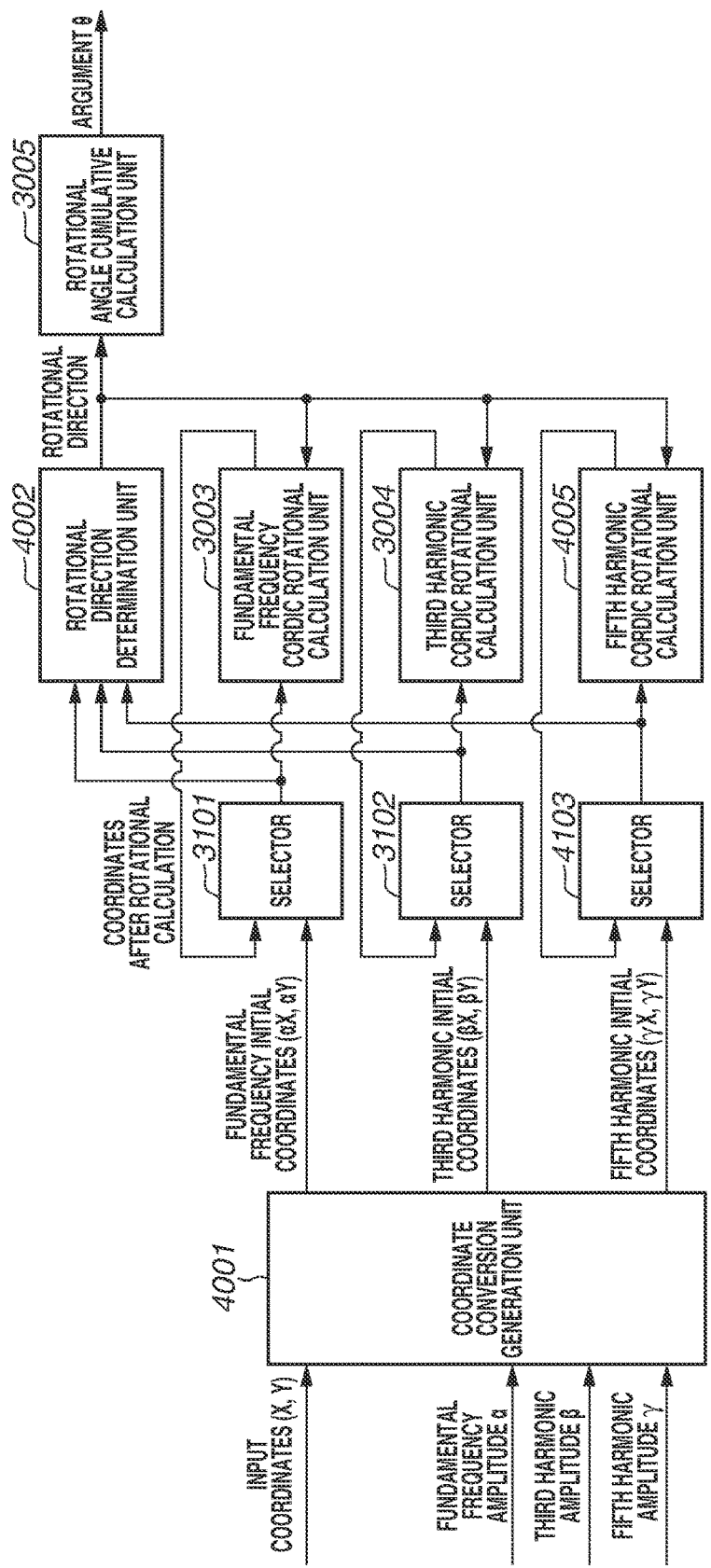
FIGS. 25A and 25B each illustrate an example of a configuration of a CORDIC according to a seventh example embodiment.

FIG. 25A illustrates an example of a configuration of the CORDIC according to the seventh example embodiment. FIG. 25A is a configuration in which a selector 4103 and a fifth harmonic CORDIC rotational calculation unit 4005 are added, and a coordinate conversion generation unit 4001 and a rotational direction determination unit 4002 are provided instead of the coordinate conversion generation unit 3001 and the rotational direction determination unit 3002, respectively, compared to FIG. 24A. The fifth harmonic CORDIC rotational calculation unit 4005 is a rotational calculation unit for the fifth harmonic. The CORDIC according to the present example embodiment performs processing based on the discriminant (30). In the following description, differences of the present example embodiment from the sixth example embodiment will be described. The coordinate conversion generation unit 4001 inputs the input two-dimensional coordinate data (X, Y), the fundamental frequency amplitude α, the third harmonic amplitude β, and the fifth harmonic amplitude γ, and outputs the fundamental frequency initial coordinate data (αX, αY), the third harmonic initial coordinate data (βX, βY), and fifth harmonic initial coordinate data (γX, γY). More specifically, the coordinate conversion generation unit 4001 multiplies the two-dimensional coordinate data (X, Y) by the fundamental frequency amplitude α, and outputs the fundamental frequency initial coordinate data (αX, αY) to the selector 3101. Further, the coordinate conversion generation unit 4001 multiplies the two-dimensional coordinate data (X, Y) by the third harmonic amplitude β, and outputs the third harmonic initial coordinate data (βX, βY) to the selector 3102. Further, the coordinate conversion generation unit 4001 multiplies the two-dimensional coordinate data (X, Y) by the fifth harmonic amplitude γ, and outputs the fifth harmonic initial coordinate data (γX, γY) to the selector 4103. The selector 4103 is a selector for the fifth harmonic, and selects the fifth harmonic initial coordinate data (γX, γY) output from the coordinate conversion generation unit 4001 and outputs this data to the CORDIC rotational calculation unit 4005 at the first calculation (i=0). Further, the selector 4103 selects fifth harmonic rotated data output from the CORDIC rotational calculation unit 4005 and outputs this data to the CORDIC rotational calculation unit 4005 at the second and subsequent calculations (i=1 or larger). The rotational direction determination unit 4002 is a rotational direction determination unit, and determines the rotational direction with use of the discriminant (30) based on the pieces of coordinate data selected by the selectors 3101, 3102, and 4103. The CORDIC rotational calculation unit 4005 rotates the coordinate data selected by the selector 4103 in the rotational direction determined by the rotational direction determination unit 4002 by $5\theta_i$, which is five times as large as the rotational angle sequence $\theta_i$, and outputs the fifth harmonic rotated coordinate data to the selector 4103. In other words, the CORDIC rotational calculation unit 4005 rotates the coordinate data by the rotational angle of $5 \times \tan^{-1}(2^{-i})$ in the i-th cycle. To improve the accuracy while dealing with a higher harmonic, this effect can be achieved by adding a CORDIC rotational calculation unit for a seventh harmonic and a ninth harmonic.

Figure 25B:
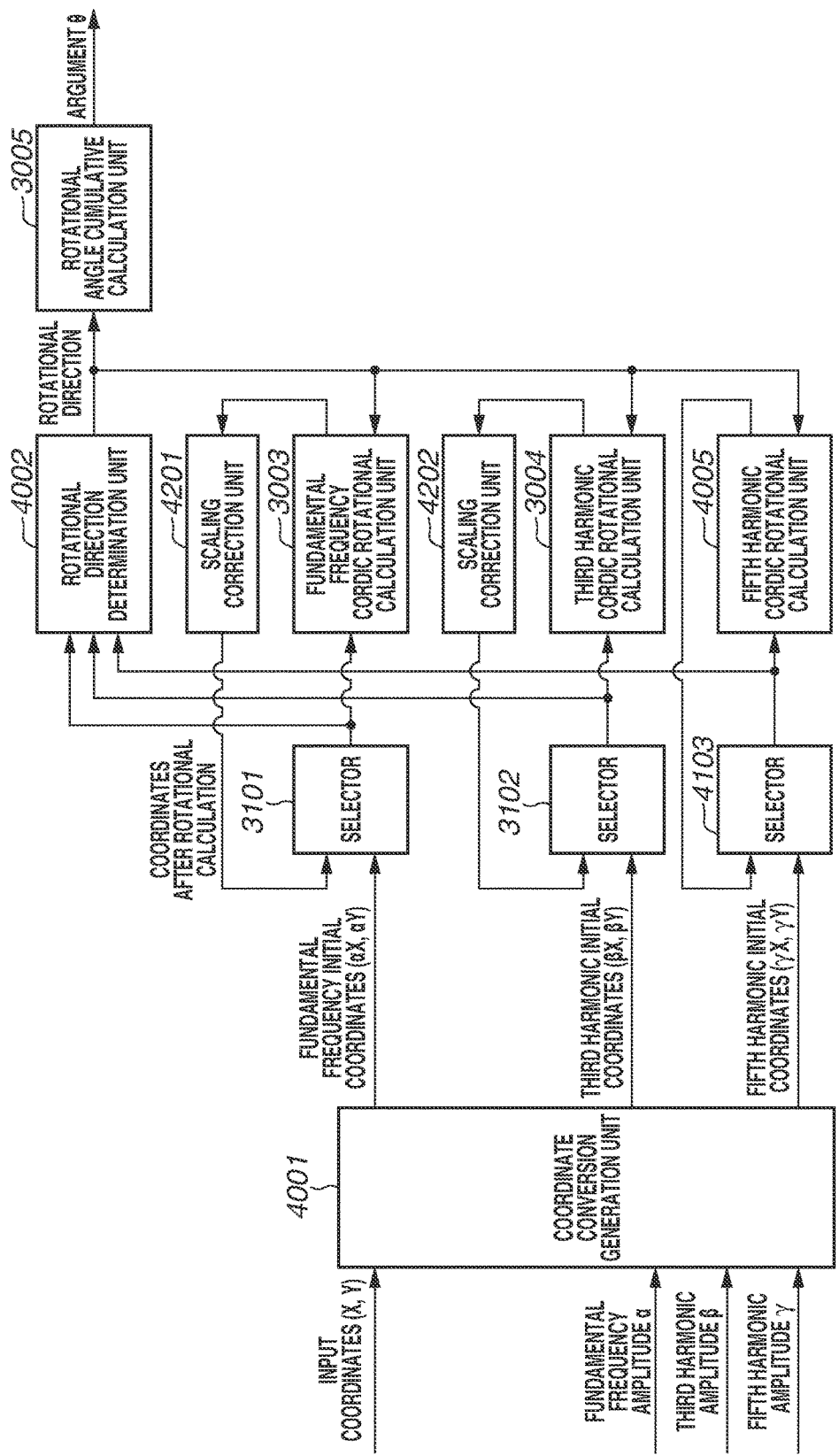

FIG. 25B illustrates an example of another configuration of the CORDIC according to the present example embodiment, and is a configuration in which scaling correction units 4201 and 4202 are added to the configuration of FIG. 25A. The scaling correction units 4201 and 4202 function to make the change rate of the input/output absolute value consistent among the plurality of CORDIC rotational calculation units 3003, 3004, and 4005, and, for this purpose, determine one of them as a reference and carries out the scaling correction on the other two outputs, similarly to FIG. 24B. As one example thereof, the scaling correction unit 4201 is a scaling correction unit for the fundamental frequency. The scaling correction unit 4201 carries out the scaling correction on the data output from the fundamental frequency CORDIC rotational calculation unit 3003, and the scaling correction unit 4202 carries out the scaling correction on the data output from the third harmonic CORDIC rotational calculation unit 3004.

More specifically, in the i-th cycle, the scaling correction unit 4201 multiplies the data output from the fundamental frequency CORDIC rotational calculation unit 3003 by $(1+2^{-2i}) \times (1+2^{-2i})$, and outputs a result of this multiplication to the selector 3101 as the fundamental frequency rotated coordinate data. The scaling correction unit 4202 is a scaling correction unit for the third harmonic, and multiplies the data output from the third harmonic CORDIC rotational calculation unit 3004 by $(1+2^{-2i})$ and outputs a result of this multiplication to the selector 3102 as the third harmonic rotated coordinate data in the i-th cycle. The scaling correction unit 4202 carries out the calculation constituted by the bit shift and the addition once, and the scaling correction unit 4201 carries out the calculation constituted by the bit shift and the addition twice. The selector 3101 selects the data output from the scaling correction unit 4201 and outputs this data to the CORDIC rotational calculation unit 3003 when i is i=1 or larger. The selector 3102 selects the data output from the scaling correction unit 4202 and outputs this data to the CORDIC rotational calculation unit 3004 when i is i=1 or larger.

In the sixth and seventh example embodiments, the case has been described where there is no difference between initial phases of the superposed harmonic and the fundamental frequency, and the initial phases of the harmonic and the fundamental frequency are in phase with each other. In the actual waveform, a phase difference from the fundamental frequency occurs for each harmonic due to the motor's structural factor. When the initial phase of the third harmonic with respect to the fundamental frequency is $\varphi$, the above-described discriminant (24) is modified as indicated by the following expressions (31) and (32).

$$Y/X \geq (\alpha \sin \theta + \beta \sin(3\theta+\varphi))/(\alpha \cos \theta - \beta \cos(3\theta+\varphi)) \quad (31)$$

$$(-\alpha X \sin \theta + \alpha Y \cos \theta) - (\beta X \sin(3\theta+\varphi) + \beta Y \cos(3\theta+\varphi)) \geq 0 \quad (32)$$

This phase $\varphi$ can be collected by subjecting the observed waveform to analysis processing, and is unchangeable as long as the structure of the motor is unchanged and therefore only has to be collected once basically.

The collected phase $\varphi$ should be realized as processing for shifting the initial phase in the CORDIC calculation processing.

Figure 26A:
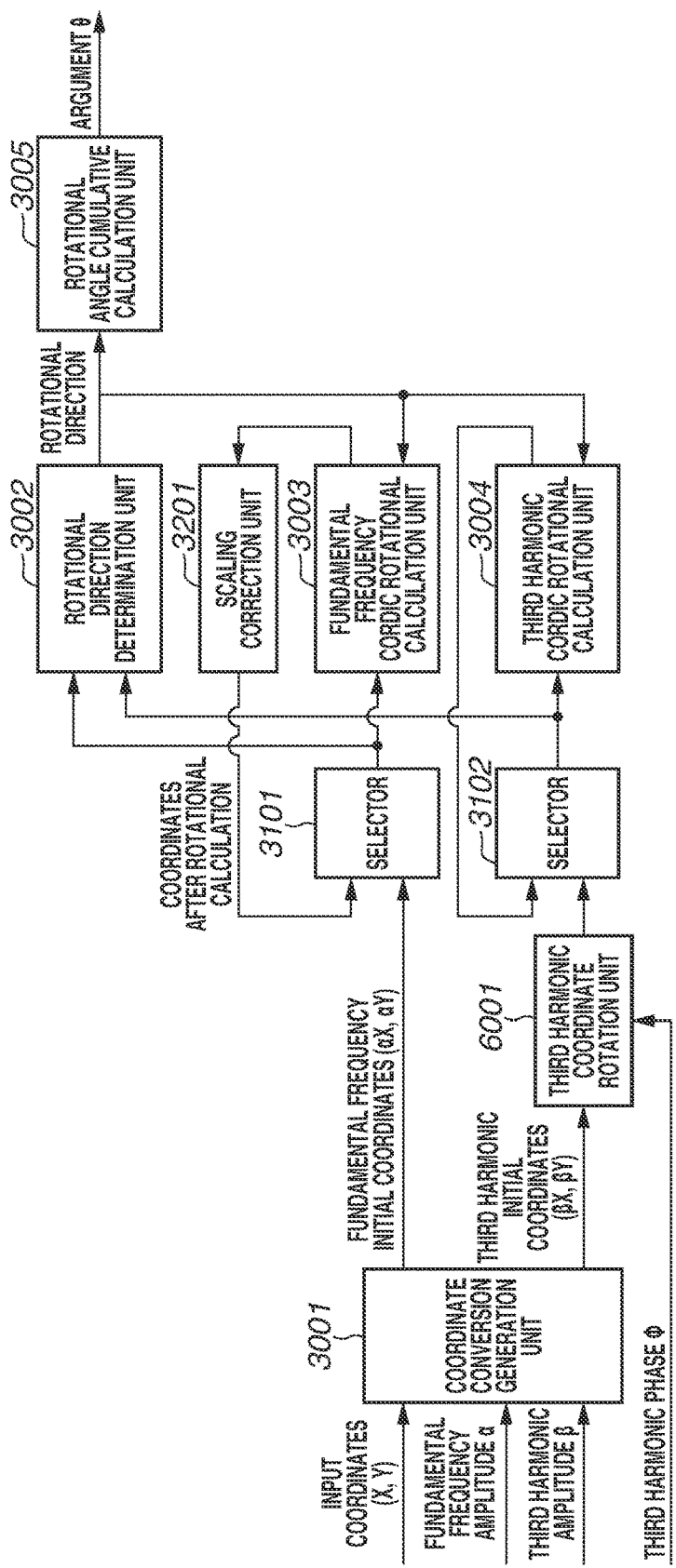
FIGS. 26A and 26B each illustrate an example of a configuration of a CORDIC according to an eighth example embodiment.

Therefore, as illustrated in FIG. 26A, an eighth example embodiment includes a third harmonic coordinate rotation unit 6001 for rotating the initial coordinates ($\beta X$, $\beta Y$) to be input to the selector 3102, which is the stage preceding to the third harmonic CORDIC rotational calculation unit 3004, by the phase $\varphi$.

This third harmonic coordinate rotation unit 6001 rotates the input coordinates ($\beta X$, $\beta Y$), and outputs ($\beta X \cos \varphi - \beta Y \sin \varphi$, $\beta X \sin \varphi + Y \cos \varphi$). After being rotated by the phase $\varphi$ by this coordinate rotation unit 6001, the signal processed as the third harmonic is rotated by $3\theta$ by the third harmonic CORDIC rotational calculation unit 3004, and therefore is rotated by $3\theta+\varphi$ in total. Therefore, the present example embodiment makes a determination corresponding to the above-described discriminant (32).

Further, when the fifth harmonic is superposed and the initial phase thereof with respect to the fundamental frequency is $\varphi$, the above-described discriminant (30) is modified as indicated by the following expression (33).

$$(-\alpha X \sin \theta + \alpha Y \cos \theta) - (\beta X \sin(3\theta+\varphi) + \beta Y \cos(3\theta+\varphi)) + (-\gamma X \sin(5\theta+\varphi) + \gamma Y \cos(5\theta+\varphi)) \geq 0 \quad (33)$$

Figure 26B:
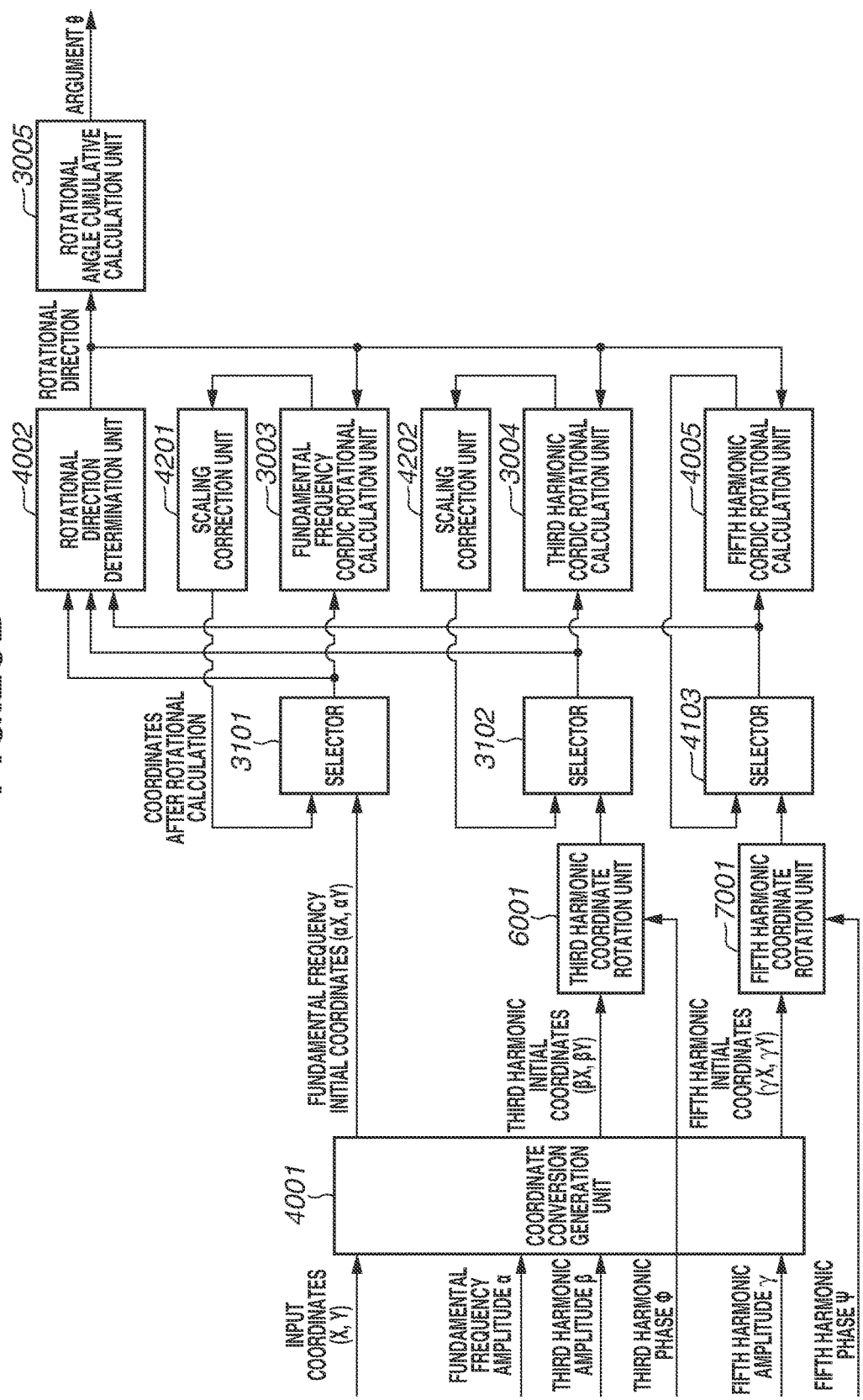

The configuration capable of making the above-described determination is realized by a configuration illustrated in FIG. 26B, in which the configuration illustrated in FIG. 25B is additionally provided with the above-described third harmonic coordinate rotation unit 6001 that rotates the initial coordinates of the third harmonic and a fifth harmonic coordinate rotation unit 7001 that rotates the initial coordinates of the fifth harmonic at stages respectively preceding to the corresponding selectors 3102 and 4103.

The third harmonic coordinate rotation unit 6001 operates in a similar manner to the unit 6001 illustrated in FIG. 26A, and the fifth harmonic coordinate rotation unit 7001 rotates the input coordinates ($\gamma X$, $\gamma Y$), and outputs ($\gamma X \cos \varphi + Y \sin \varphi$, $-\gamma X \sin \varphi + \gamma Y \cos \varphi$). Similarly to the third harmonic, after being rotated by the phase c by this coordinate rotation unit 7001, the signal processed as the fifth harmonic is rotated by $5\theta$ by the fifth harmonic CORDIC rotational calculation unit 4005, and therefore is rotated by $5\theta+\varphi$ in total. Therefore, the present example embodiment can make a determination corresponding to the above-described discriminant (33).

According to the sixth, seventh, and eighth example embodiments, from instantaneous values of the sine wave and the cosine wave with the harmonic superposed on each of them, the phase of the rotational angle of the fundamental frequency at this instantaneous moment can be detected with high accuracy, which eliminates the necessity for the calculation of the correction value and the correction value memory for correcting the harmonic distortion. Further, the sixth and seventh example embodiments do not require the calculation of the correction value, and therefore can detect the phase with low delay and thus detect the rotational position of the motor at a high speed, thereby facilitating the positional control of the motor or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Applications No. 2016-092383, filed May 2, 2016, No. 2016-092384, filed May 2, 2016, and No. 2016-118015, filed Jun. 14, 2016, which are hereby incorporated by reference herein in their entirety.

What is claimed is:

1. An information processing apparatus for supplying a rotational angle of a moving object to a controller of the moving object, comprising:
   an encoder configured to acquire a first phase signal and a second phase signal that are acquired by measuring a rotation of the moving object; and
   a calculation unit comprising at least one processor configured to calculate the rotational angle of the moving object by an iterative calculation so as to satisfy a relational expression bearing an arctangent, the relational expression bearing the arctangent using addition or subtraction including a first cosine wave and a second cosine wave at a higher harmonic of the first cosine wave for the first phase signal, and addition or subtraction a first sine wave and a second sine wave at a higher harmonic of the first sine wave for the second phase signal.

2. The information processing apparatus according to claim 1, wherein at least one of the first phase signal and the second phase signal is at least one of an analog signal and a signal having a wave shape.

3. The information processing apparatus according to claim 1, further comprising a control unit configured to control a device based on the calculated rotation angle.

4. The information processing apparatus according to claim 1, wherein the iterative calculation is a CORDIC calculation.

5. The information processing apparatus according to claim 1, wherein initial values of the first sine wave and the second sine wave are zero in the iterative calculation.

6. The information processing apparatus according to claim 1, wherein the calculation unit includes a plurality of calculation circuits configured to carry out respective calculations included in the iterative calculation, and
wherein the calculation circuits are connected together as a pipeline.

7. The information processing apparatus according to claim 1, wherein the calculation unit includes a plurality of calculation circuits configured to carry out respective calculations included in the iterative calculation, and
wherein the calculation circuits are connected together recursively.

8. The information processing apparatus according to claim 1, further comprising an output unit configured to output a signal in which at least any one component of the second cosine wave and the second sine wave is removed.

9. The information processing apparatus according to claim 1, further comprising a control unit configured to control a rotation of a motor that controls a position of the moving object based on a result of the calculation by the calculation unit.

10. The information processing apparatus according to claim 4, wherein the calculation unit includes a correction unit configured to correct an absolute value of coordinate data in the CORDIC calculation.

11. The information processing apparatus according to claim 8, wherein the output unit outputs the signal as an encoder signal indicating a positional displacement of the moving object.

12. A recording medium storing a program that upon execution by a computer causes the computer to function as an information processing apparatus for supplying a rotational angle of a moving object to a controller of the moving object, the information processing apparatus comprising:
an acquisition unit configured to acquire a first phase signal and a second phase signal that are acquired by an encoder measuring a rotation of the moving object; and
a calculation unit configured to calculate the rotational angle of the moving object by an iterative calculation so as to satisfy a relational expression bearing an arctangent, the relational expression bearing the arctangent using addition or subtraction including a first cosine wave and a second cosine wave at a higher harmonic of the first cosine wave for the first phase signal, and addition or subtraction including a first sine wave and a second sine wave at a higher harmonic of the first sine wave for the second phase signal.

\* \* \* \* \*